United States Patent
Kwon et al.

(10) Patent No.: US 10,645,527 B2
(45) Date of Patent: May 5, 2020

(54) METHOD AND APPARATUS FOR CONTROLLING SEMI-PERSISTENT SCHEDULING

(71) Applicants: SK TELECOM CO., LTD., Seoul (KR); INNOSKY, Seoul (KR)

(72) Inventors: Ki Bum Kwon, Seoul (KR); Dong Hyun Park, Seoul (KR)

(73) Assignees: SK TELECOM CO., LTD., Seoul (KR); INNOSKY, Seoul (KR)

( * ) Notice: Subject to any disclaimer, the term of this patent is extended or adjusted under 35 U.S.C. 154(b) by 0 days.

(21) Appl. No.: 15/670,308

(22) Filed: Aug. 7, 2017

(65) Prior Publication Data

US 2018/0048994 A1 Feb. 15, 2018

(30) Foreign Application Priority Data

Aug. 11, 2016 (KR) .......................... 10-2016-0102422

(51) Int. Cl.
| | |
|---|---|
| *H04W 4/00* | (2018.01) |
| *H04W 4/021* | (2018.01) |
| *H04W 72/04* | (2009.01) |
| *H04W 4/08* | (2009.01) |
| *H04W 64/00* | (2009.01) |
| *H04W 72/02* | (2009.01) |

(Continued)

(52) U.S. Cl.
CPC .............. *H04W 4/021* (2013.01); *H04W 4/08* (2013.01); *H04W 64/006* (2013.01); *H04W 72/02* (2013.01); *H04W 72/04* (2013.01); *H04W 72/1263* (2013.01); *H04W 72/1294* (2013.01); *H04W 76/11* (2018.02)

(58) Field of Classification Search
CPC ..... H04W 4/021; H04W 4/08; H04W 64/006; H04W 72/02; H04W 72/04; H04W 72/1263; H04W 72/1294; H04W 76/11
See application file for complete search history.

(56) References Cited

U.S. PATENT DOCUMENTS

| | | | |
|---|---|---|---|
| 2014/0023008 A1 | 1/2014 | Ahn et al. | |
| 2015/0312936 A1* | 10/2015 | Nguyen | H04L 1/0061 370/280 |
| 2019/0014564 A1* | 1/2019 | Lee | H04W 4/40 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.2.0, Jun. 2016, pp. 1-140, 3GPP.

(Continued)

*Primary Examiner* — Khai M Nguyen
(74) *Attorney, Agent, or Firm* — Paratus Law Group, PLLC

(57) ABSTRACT

A communication system configures a plurality of sidelink (SL) Semi-Persistent Scheduling (SPS) for a user device. In some embodiments, a method includes generating, by a base station, SL SPS configuration information for the user device, wherein the SL SPS configuration information comprises: an SL SPS radio network temporary identifier (RNTI) for the user device; and SL SPS index information to indicate a plurality of SL SPS configurations for the user device. The method further includes configuring a radio resource control (RRC) message comprising the SL SPS configuration information and transmitting, by the base station and to the user device, the RRC message.

9 Claims, 13 Drawing Sheets

(51) Int. Cl.
  *H04W 72/12*  (2009.01)
  *H04W 76/11*  (2018.01)

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213 V13.2.0, Jun. 2016, pp. 335-369, 3GPP.

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.2.0, Jun. 2016, pp. 1-91, 3GPP.

"3rd Generation Partnership Project; Technical Specification Group Radio Access Network; Evolved Universal Terrestrial Radio Access (E-UTRA); Radio Resource Control (RRC) protocol specification (Release 13)," 3GPP TS 36.331 V13.2.0, Jun. 2016, pp. 1-623, 3GPP.

International Search Report for PCT/KR2017/008600 dated Nov. 23, 2017 from Korean Intellectual Property Office.

Written Opinion of the International Searching Authority for PCT/KR2017/008600 dated Nov. 23, 2017 from Korean Intellectual Property Office.

Zte, "SPS enhancement for V2V over PC5", 3GPP TSG RAN WG2 #94, R2-163836, May 13, 2016, Nanjing, China.

Huawei et al., "SPS enhancement for V2V", 3GPP TSG RAN WG1 Meeting #85, R1-164818, May 14, 2016, Nanjing, China.

LG Electronics, "Discussion on details of (E)PDCCH used for sidelink SPS", 3GPP TSG RAN WG1 Meeting #85, R1-164514, May 14, 2016, Nanjing, China.

Samsung, "UE reporting and dynamic SL SPS transmission", 3GPP TSG RAN WG2 Meeting #94, R2-163451, May 13, 2016, Nanjing, China.

Extended European Search Report for related EP application No. 17839793.1 dated Feb. 26, 2020 from European Patent Office.

Ericsson, "Sidelink Resource Allocation in V2X", 3GPP TSG-RAN WG2 #94, Tdoc R2-164105, May 22, 2016, pp. 1-5, Nanjing, P.R. China.

Huawei, Hisilicon, "Enhancements for sidelink Resource Allocation", 3GPP TSG-RAN WG2 #94, R2-163812, May 22, 2016, pp. 1-4, Nanjing, China.

Zte, "SPS enhancements for V2V over PC5", 3GPP TSG RAN WG2 #94, R2-163836, May 22, 2016, pp. 1-3, Nanjing, China.

* cited by examiner

R/R/E/LCID/F/L SUBHEADER
(7-BIT L FIELD)

FIG.13

| R | R | E | LCID | Oct 1 |
|---|---|---|------|-------|
| F | | | L | Oct 2 |
| | | | L | Oct 3 |

R/R/E/LCID/F/L SUBHEADER
(15-BIT L FIELD)

FIG.14

| R | R | E | LCID | Oct 1 |
|---|---|---|------|-------|

R/R/E/LCID SUBHEADER

METHOD AND APPARATUS FOR CONTROLLING SEMI-PERSISTENT SCHEDULING

CROSS-REFERENCE TO RELATED APPLICATION

This application claims priority from and the benefit of Korean Patent Application No. 10-2016-0102422, filed on Aug. 11, 2016, which is hereby incorporated by reference in its entirety.

BACKGROUND

1. Field

The present disclosure relates to a wireless communication system, and more particularly, to a method and apparatus for semi-persistent scheduling for vehicle-to-everything (V2X).

2. Discussion of the Background

Vehicle-to-everything (vehicle-to-X: V2X) communication refers to a communication scheme that is capable of 1) providing general wireless communication service, such as voice calls, data transmission, and the like, and 2) exchanging or sharing information during driving, such as traffic conditions or the like, through communication with other vehicles, pedestrian-based wireless terminals such as smart phones, or infrastructures such as a mobile communication network or a wireless communication device installed in a roadway. V2X may include vehicle-to-vehicle (V2V) indicating communication between terminals carried by vehicles, vehicle-to-pedestrian (V2P) indicating communication between terminals carried by a vehicle and an individual, and vehicle-to-infrastructure/network (V2I/N) indicating communication between a vehicle and a roadside unit (RSU)/network. In this last instance, the RSU may be a transportation infrastructure entity embodied by a fixed terminal or a base station. For example, it may be an entity that transmits a speed notification to a vehicle.

Technologies which are additionally required by the current LTE system and a next-generation wireless communication system are currently discussed based on performance requirements for supporting V2X in the LTE system and the next generation wireless communication system. Also under discussion is a semi-persistent scheduling (SPS) scheme that efficiently supports periodic data transmission; this scheme is required for supporting a vehicle communication service, and a plurality of SPS configurations. However, an SPS activation and deactivation scheme for supporting a plurality of SPS configurations has not yet been determined.

SUMMARY

An example embodiment of the present disclosure describes a method of supporting sidelink (SL) semi-persistent scheduling (SPS) of a user equipment (UE) by an evolved node B (eNB) in a wireless communication system. The method may include transmitting, to the UE, information associated with a plurality of SL SPS configurations to be configured for the UE; and transmitting, to the UE, SL SPS-related control information for each of one or more SL SPS configurations out of the plurality of SL SPS configurations.

An example embodiment of the present disclosure describes a method of performing sidelink (SL) semi-persistent scheduling (SPS) transmission/reception by a UE in a wireless communication system. The method may include: receiving, from an eNB, information associated with a plurality of SL SPS configurations to be configured for the UE; and receiving, from the eNB, SL SPS-related control information for each of one or more SL SPS configurations out of the plurality of SL SPS configurations.

Descriptions provided below may be applied, individually or in combination, to embodiments provided according to various aspects of the present invention.

The information associated with the plurality of SL SPS configurations may include identification information for each of the plurality of SL SPS configurations.

The SL SPS-related control information may include identification information for each of one or more SL SPS configurations.

The SL SPS-related control information may further include activation or deactivation indication information associated with a predetermined SL SPS configuration or with SL grant information associated with the predetermined SL SPS configuration.

The SL SPS-related control information may be transmitted through a Medium Access Control (MAC) Control Element (CE) or through the Downlink Control Information (DCI) of a Physical Downlink Control Channel (PDCCH) or an Enhanced PDCCH (EPDCCH).

The identification information may be a Radio Network Temporary Identity (SPS SL-RNTI) or an SL_SPS_Index.

BRIEF DESCRIPTION OF THE DRAWINGS

FIGS. 12 to 16 are diagrams illustrating the configuration of a MAC PDU according to the present invention;

DETAILED DESCRIPTION OF THE ILLUSTRATED EMBODIMENTS

Figure 1:
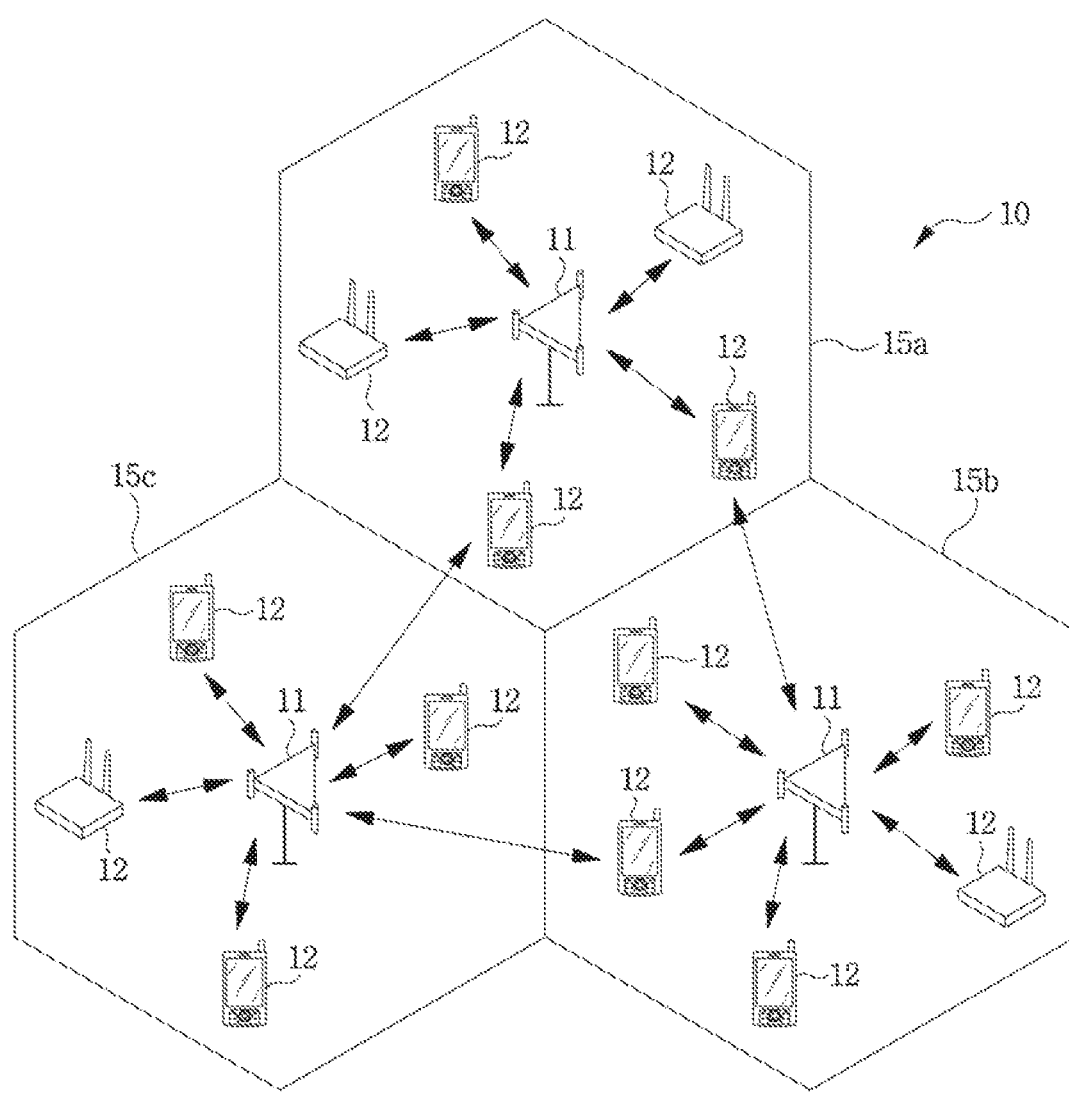
FIG. 1 is a block diagram illustrating a wireless communication system to which the present invention is applied.

Example embodiments of the present invention will be described more fully hereinafter, with reference to the accompanying drawings which show the example embodiments of the invention. Throughout the drawings and the detailed description, unless otherwise described, the same drawing reference numerals are understood to refer to the same elements, features, and structures. In describing the example embodiments, detailed descriptions of known configurations or functions may be omitted for clarity and conciseness.

Further, the description herein is related to a wireless communication network. One or more operations in a wireless communication network may be performed in a process of controlling a network and transmitting data by a system that controls the wireless network (e.g., a base station), or may be performed in a user equipment communicating with the wireless communication network.

In a network system including a plurality of network nodes, e.g., a base station, various operations for facilitating a communication with a mobile device or various operations for communicating with a mobile device may be performed by a base station or other network nodes in the network system. The base station (BS) may be referred to as a fixed station, Node B, Evolved Node B (eNB), an access point (AP), etc. A mobile terminal may be referred to as a mobile device, user equipment (UE), a mobile station (MS), a mobile subscriber station (MSS), a subscriber station (SS), non-access point station (non-AP STA), etc.

FIG. 1 is a block diagram illustrating a wireless communication system.

The network structure illustrated in FIG. 1 may be a network structure of an Evolved-Universal Mobile Telecommunications System (E-UMTS). The E-UMTS system may include a Long-Term Evolution (LTE) system, an LTE-Advanced (LTE-A) system, a 3rd Generation Partnership Project (3GPP) Standard-based network structure which satisfies the International Mobile Telecommunication-2020 (IMT-2020) standard defined by the International Telecommunication Union-Radio communication sector (ITU-R), or the like.

Referring to FIG. 1, a wireless communication system 10 may provide a communication service between a base station (BS) and a user equipment (UE). In a wireless communication system, a UE and a BS may wirelessly transmit and receive data. Also, the wireless communication system may support Device-to-Device (D2D) communication between UEs. A wireless communication system that supports D2D communication will be described later.

The BS 11 of the wireless communication system 10 may provide a communication service to a UE existing within the transmission coverage of the BS 11, through a predetermined frequency band. The coverage range within which a BS provides a service is also referred to as a site. The site may include various areas 15a, 15b, and 15c, which may be referred to as sectors. The sectors included in the site may have different identifiers, respectively, so that each sector can be identified by its own sector identifier. Each sector 15a, 15b, and 15c may be construed as a part of the area that the BS 11 covers.

ABS 11 communicates with UE 12. BS 11 may be referred to as eNB (evolved-NodeB), BTS (Base Transceiver System), Access Point, femto base station, Home nodeB, relay and Remote Radio Head (RRH).

A user equipment 12 (mobile station, MS) may be stationary or mobile, and may also be referred to using different terms, including UE (user equipment), MT (mobile terminal), UT (user terminal), SS (subscriber station), wireless device, PDA (personal digital assistant), wireless modem, handheld device, or connected car.

A base station 11 can be also referred a cell, which inclusively is referred to various coverage areas, such as mega cell, macro cell, micro cell, pico cell, and femto cell. A cell may be used as a term for indicating a frequency band that a BS provides, a coverage of a BS, or a BS. Further, the base station 11 may include different types of base stations and different terms may be used to distinguish the different type of base stations from each other. For example, in a dual connectivity configuration where one mobile terminal is connected to two or more base stations, the base station 11 may include at least two types of base stations, a master eNodeB and a secondary eNodeB. The master eNodeB (MeNB) is capable of controlling radio resource control connection, by directly transmitting radio resource control connection signaling to a UE, and controlling mobility of the UE including a handover process. The secondary eNodeB (SeNB), which may not have the above capabilities of the MeNB, provides the UE with additional radio resource and performs partial radio resource control for the UE while other radio resource controls are performed by an MeNB.

Hereinafter, the term downlink refers to communication from a BS 11 to a UE 12, and the term uplink refers to communication from a UE 12 to a BS 11. For a downlink, a transmitter may be part of a BS 11, and a receiver may be part of a UE 12. For an uplink, a transmitter may be part of a UE 12 and a receiver may be part of a BS 11.

There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA. Uplink transmission and downlink transmission can use either TDD (Time Division Duplex), which uses different time locations for transmissions, or FDD (Frequency Division Duplex), which uses different frequencies for transmissions.

Abbreviations used in the present disclosure are defined as follows:
D2D: Device to Device (communication)
ProSe: (Device to Device) Proximity Services
V2X: Vehicle to X (everything)
V2V: Vehicle to Vehicle
V2P: Vehicle to Pedestrian
V2I/N: Vehicle to Infrastructure/Network
GNSS: Global Navigation Satellite System
RSU: Road Side Unit
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel Also, various operation modes may be defined based on a resource allocation scheme for a direct link (e.g., D2D, ProSe, or SL communication). Data and control information for direct link (e.g., D2D, ProSe, or SL) communication are called direct data and direct control information, respectively.

Mode 1 indicates an operation mode in which a UE reports the amount of data to be transmitted through a direct link for transmitting direct data and direct control information to an evolved node B (eNB) through a link between the UE and the eNB, and the eNB (or a relay) accurately schedules a resource to be used by the UE through the direct link based on the information reported through the link between the UE and the eNB. Mode 2 indicates an operation mode in which the UE autonomously selects a resource to transmit direct data and direct control information from a currently available resource pool, based on either information that is stored in advance in a USIM or a memory in the UE or on information obtained by receiving system information from the eNB.

Here, the resource pool includes some of the available radio resources of an eNB (or a device having management authority for the radio resources in a network) by taking into consideration the available radio resources such as available time, frequency, space, code, or the like defined in a wireless communication system for direction control information and data transmission. A resource unit for each bit is defined using a bitmap to indicate the resource pool. A resource corresponding to a part marked with '1' is included in the corresponding resource pool. The location of a resource indicated by the bitmap, and the bitmap is repetitively provided by a network, e.g., BS 11.

Hereinafter, although embodiments of the present invention are described by using V2X communication as an example, the scope of the present invention may not be limited to V2X communication. Further, the embodiments of the present invention may be applied to direct link based communication, such as D2D, ProSe, SL communication, or the like.

V2X is a term that generally indicates V2V, V2P, and V2I/N, and each of V2V, V2P, and V2I/N may be defined as below in association with LTE communication or a next generation mobile communication system.

V2V (Vehicle-to-Vehicle)

V2V covers LTE-based or next generation mobile communication system-based communication between vehicles. That is, V2V may be defined as LTE-based or next generation mobile communication system-based communication between vehicles.

V2P (Vehicle-to-Pedestrian)

V2P covers LTE-based or next generation mobile communication system-based communication between a vehicle and a device carried by an individual (e.g., portable terminal carried by a pedestrian, a cyclist, a driver, or a passenger). That is, V2P may be defined as LTE-based or next generation mobile communication system-based communication between a vehicle and an individual.

V2I/N (Vehicle-to-Infrastructure/Network)

V2I/N covers LTE-based or next generation mobile communication system-based communication between a vehicle and a roadside unit/network. A roadside unit (RSU) may be a transportation infrastructure entity (e.g., an entity that transmits a speed notification) embodied by a fixed UE or an eNB. V2I may indicate communication between a vehicle and a server, and V2N may indicate communication between a vehicle and an eNB. However, they may not be limited thereto, and may be commonly called V2I/N.

For a V2V operation based on PC5 which is a D2D communication link (i.e., a direct interface between two devices), various scenarios are considered as follows.

(Type 1) An Operation Band Used as Test Points for Evaluation

Case 1A: 6 GHz

Case 1B: 2 GHz

Other frequency bands may be considered, in addition to the above cases. For example, one of the ISM bands may be used. Alternatively, one of the common frequencies that are operable in the LTE and the next generation mobile communication system, used commonly all over the world, may be considered.

(Type 2) An eNB Disposition Including the Probability of Network Control

Case 2A: autonomous resource allocation by a mode 2 UE based on semi-statically network configured/pre-configured wireless parameters Case 2B: a larger number of UE-specific and/or dynamic resource allocations provided by eNBs, including mode 1, that is distinct from Case 2A (Type 3)

Case 3A: UEs perform communication based on PC5 that uses a single carrier

Case 3B: UEs perform communication based on PC5 that uses multiple carriers (Type 4)

Case 4A: operation by a single operator

Case 4B: a set of PC5-based carriers shared by UEs that subscribe to different operators. This indicates that UEs belonging to different operators are capable of transmitting a signal on the same carrier.

Case 4C: operators are allocated to different carriers. This indicates that a UE is capable of transmitting a signal only on a carrier allocated to the operator that the UE belongs to.

(Type 5) Existence Together With Uu (An Interface Between an eNB and a UE)

Case 5A: a V2X-dedicated carrier is operated. Here, uplink traffic does not exist in the Uu interface on a PC5-based carrier.

FIGS. 2 through 7 are diagrams illustrating vehicle communication in a wireless communication system to which the present invention is applied.

Figure 2:
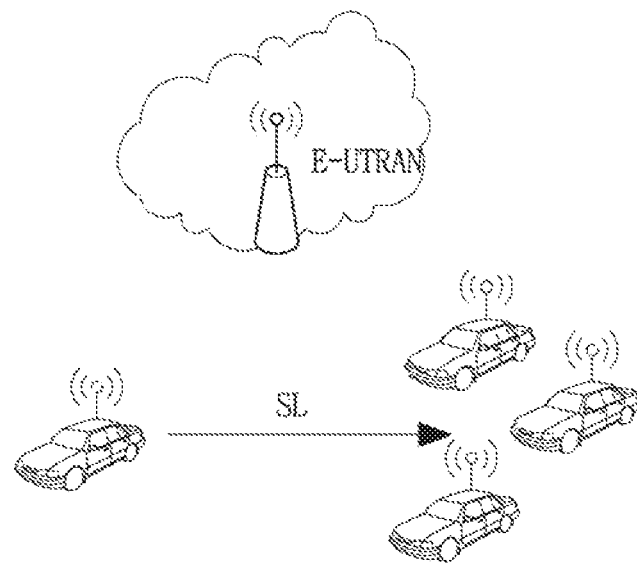
FIGS. 2 through 7 are diagrams illustrating vehicle communication in a wireless communication system to which the present invention is applied.
Figure 3:
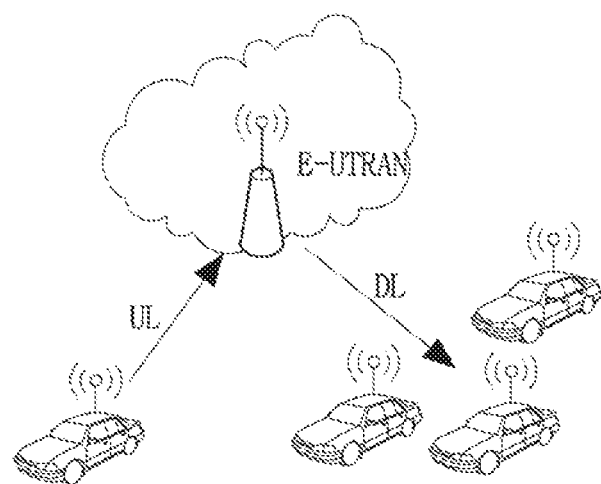
Figure 4:
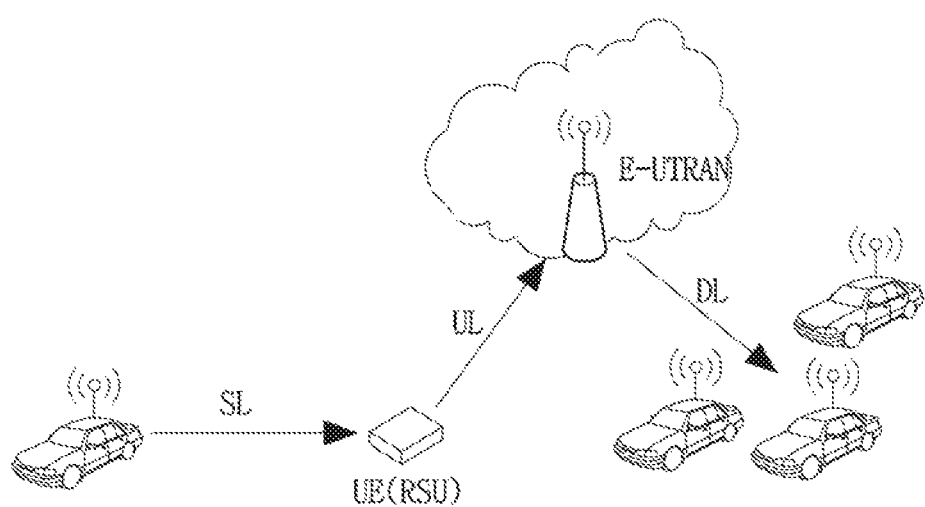
Figure 5:
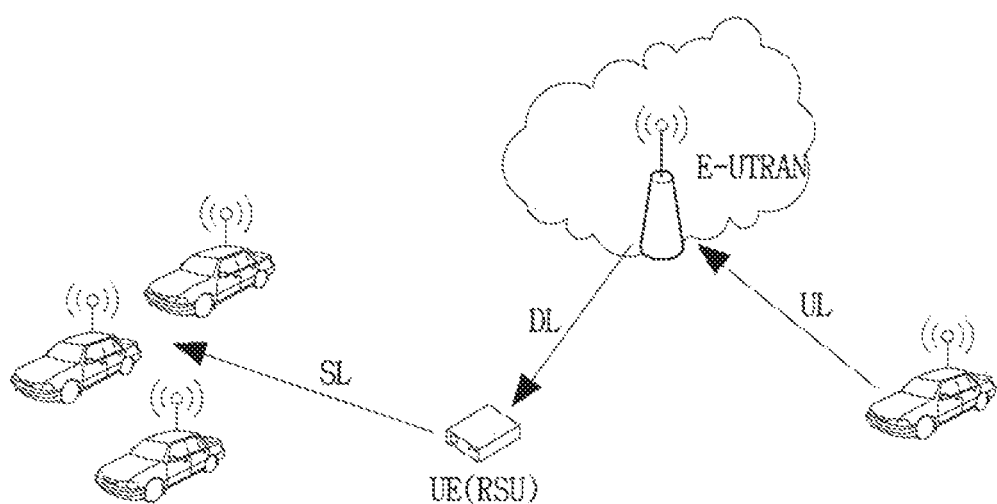

For V2X, only a PC5 link (which is a link between UEs defined for D2D or ProSe) may be considered as shown in FIG. 2. The PC5 link may be defined as a sidelink (SL). Alternatively, only a Uu link, which is a link between an eNB and a UE, may be considered as illustrated in FIG. 3. Alternatively, a road side unit (RSU) in the form of a UE is included, and both the PC5 link and the Uu link may be considered as illustrated in FIGS. 4 and 5.

Hereinafter, a UE includes the concept of a UE used by a general user, such as a smart phone and the like, and a UE contained in a vehicle.

D2D communication refers to a technology in which UEs directly receive and transmit data. Hereinafter, it is assumed that a UE disclosed in embodiments of the present invention supports D2D communication. Also, D2D communication may be interchangeably used with an expression, ProSe or ProSe-D2D communication. The use of the term "ProSe" for D2D communication may not change the meaning of direct data transmission/reception between UEs, but may add the meaning of a proximity-based service. Also, a radio interface and/or wireless communication link between UEs that perform D2D communication is defined as a sidelink (SL).

D2D communication performs 1) a discovery process for communication between UEs existing inside a network coverage (in-coverage (INC)) or outside the coverage (out-of-coverage (OCC)); and 2) a direct communication process for transmitting and receiving control data and/or traffic data between UEs. Hereinafter, a UE that transmits a signal based on D2D communication is referred to as a transmission UE (Tx UE), and a UE that receives a signal based on D2D communication is referred to as a reception UE (Rx UE). A Tx UE may transmit a discovery signal, and an Rx UE may receive a discovery signal. A Tx UE and an Rx UE may exchange their roles. A signal transmitted by a Tx UE may be received by two or more Rx UEs.

D2D communication may be used for various purposes. For example, within a commercial frequency-based network coverage site, D2D communication may be used for public safety, traffic network services, ultra-low latency services, commercial services, and the like. However, D2D communication based on a traffic network-dedicated frequency may be used only for traffic network communication, traffic safety, and the like, irrespective of network coverage.

When UEs located close to one another execute D2D communication in a cellular system, loads on an eNB may be dispersed. Also, when UEs located close to one another perform D2D communication, the UEs transmit data within a relatively short distance and thus, the transmission power consumption and transmission latency of the UEs may be decreased. In addition, from the perspective of the whole system, existing cellular-based communication and D2D communication use the same resources and thus, frequency usage efficiency may be improved when they do not overlap spatially.

D2D communication may be classified as communication between UEs existing within a network coverage (or eNB coverage) range (in-coverage (INC)), communication between UEs outside the coverage range (out-of-coverage (OOC)), and communication between a UE inside the network coverage range and a UE outside the network coverage range.

An eNB schedules resources required when in-coverage UEs transmit data through a sidelink for D2D communication in a wireless communication system. In this instance, the in-coverage UEs may report the amount of data (e.g., D2D data), which exists in a buffer of each UE and is to be transmitted through a sidelink to the eNB through a buffer status report (BSR). The BSR associated with the sidelink may be referred to as an SL BSR or a ProSe BSR, which is distinct from a BSR associated with a wide area network (WAN), such as the LTE system or a next generation mobile communication system. Also, although V2X is similar to D2D, a BSR specific to D2D for V2X may be defined separately, which may be referred to as V2X BSR, so that the BSR may be distinguished from the SL BSR in terms of service.

According to an embodiment of performing D2D communication, an eNB may transmit D2D resource allocation information to a first UE located in the coverage of the eNB. The D2D resource allocation information may include allocation information associated with a transmission resource and/or a reception resource, which may be used for D2D communication between the first UE and another UE. The first UE that receives the D2D resource allocation information from the eNB may transmit to the other UE the D2D resource allocation information associated with a D2D resource through which the D2D data is to be transmitted, so that the other UE may receive the D2D data transmitted by the first UE.

The first UE, a second UE, a third UE, and/or a fourth UE may perform D2D communication based on D2D resource allocation information. Particularly, the second UE, the third UE, and/or the fourth UE may obtain information associated with the first UE's D2D communication resource. The second UE, the third UE, and/or the fourth UE may receive D2D data transmitted from the first UE through a resource indicated by the information associated with the first UE's D2D communication resource. In this instance, the first UE may transmit information indicating the amount of D2D data that exists in the first UE's buffer to the eNB through an SL BSR, in order to receive a resource for D2D communication with the second UE, the third UE, and/or the fourth UE from the eNB.

Figure 6:
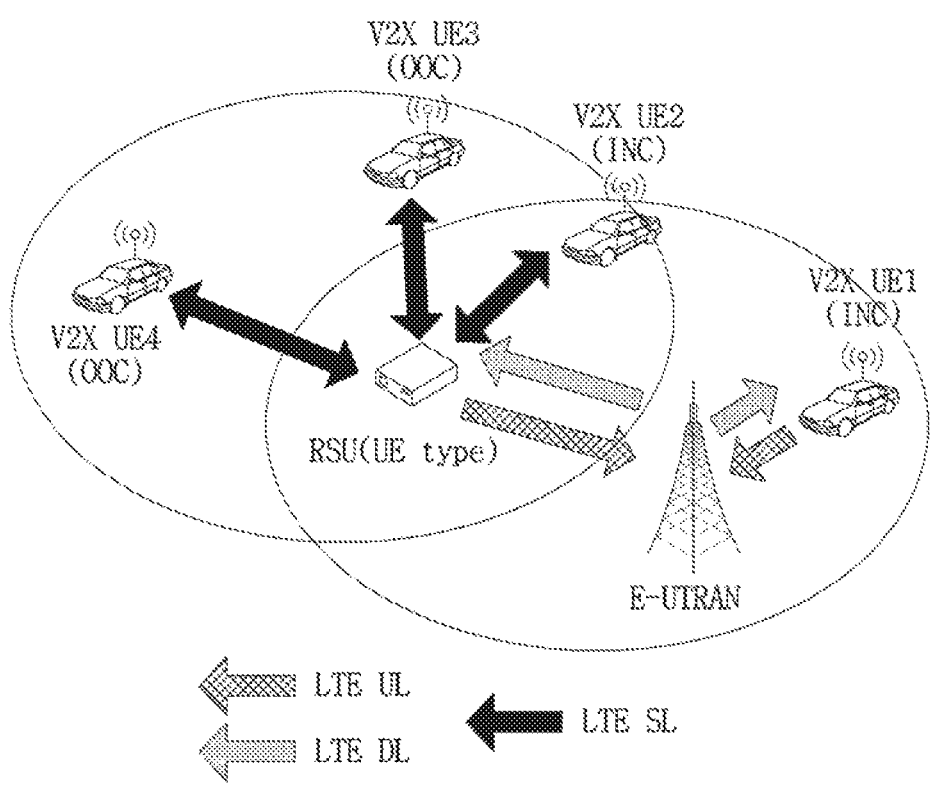

Referring to FIG. 6, a first UE (V2X UE1) and a second UE (V2X UE2) are located in a network coverage (INC) range and they are capable of performing communication with an eNB (E-UTRAN). That is, the first UE (V2X UE1) and the second UE (V2X UE2) may perform data transmission/reception for a vehicle communication service through an eNB (or Uu interface). In other words, the first UE (V2X UE1) and the second UE (V2X UE2) may mutually transmit and receive data for a vehicle communication service through a UL data transmission and a DL data reception. However, because a third UE (V2X UE3) and a fourth UE (V2X UE 4) are located outside the network coverage (OOC) range, when they are located somewhere that does not allow D2D communication with the first UE (V2X UE1) and the second UE (V2X UE2), they may not transmit and receive data for a vehicle communication service to/from the first UE (V2X UE1) and the second UE (V2X UE2). A UE is incapable of performing communication with another UE, an eNB, a server, and the like which are located in an area where a signal cannot reach physically.

However, when the fourth UE (V2X UE4) outside the network coverage range needs to access the network for a vehicle communication service, a commercial service, or the like, and D2D communication with a UE-type RSU existing in the network service range is allowed through D2D communication, the UE-type RSU acts as a relay, and thus, the fourth UE (V2X UE4) outside the network coverage range may transmit and receive data to/from an eNB through an indirect route. That is, as illustrated in FIG. 4, the UE-type RSU acts as a relay, the fourth UE (V2X UE4) transmits vehicle communication service data to the UE-type RSU through an SL, and the UE-type RSU may transfer the vehicle communication service data to the eNB using a UL transmission through the Uu interface. The UEs (e.g., the first UE and the second UE) in the network coverage range may receive the fourth UE's vehicle communication service data (V2X UE4) through a downlink of the Uu interface. UEs (e.g., the third UE and the fourth UE) that are capable of performing D2D communication with the UE-type RSU and that exist outside the network service range may transfer the fourth UE's vehicle communication service data (V2X UE4) to the UEs (first UE and the second UE) existing within the network service range through the UE-type RSU.

Figure 7:
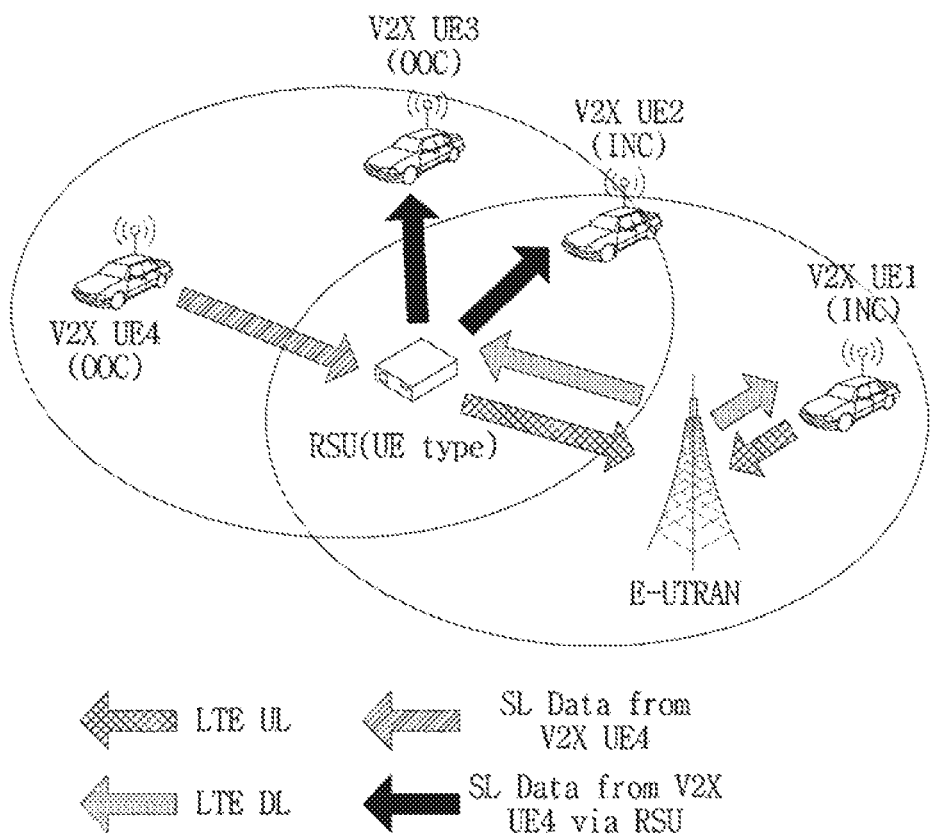

As illustrated in FIG. 7, the vehicle communication service data that the fourth UE (V2X UE4) transfers to the UE-type RSU may be transferred directly to UEs (e.g., the third UE) that are capable of performing D2D communication with the UE-type RSU and that exist outside the network service range although they are located somewhere D2D communication with the fourth UE (V2X UE4) is not allowed. A V2X service is sensitive to a delay time, and thus, may reduce the delay time that occurs while the UE-type RSU receives data again from an eNB after the UE-type RSU preferentially transfers data to the eNB for the transfer. Therefore, the UE-type RSU may prepare for the transmission of data received from the fourth UE to the eNB through the Uu interface (i.e., LTE uplink), and may prepare for the transmission of data to the third UE (V2X UE3) through an SL. Therefore, when the UE-type RSU operates in a mode in which an SL resource is controlled by the eNB, the UE-type RSU may handle vehicle communication service data received from the fourth UE (V2X UE4) as data to be included in an LTE-side BSR, and may simultaneously handle the same as data to be included in an SL BSR. That is, the UE-type RSU may deliver the vehicle communication service data received from the forth UE (V2X UE4) to a Packet Data Convergence Protocol (PDCP) layer in an LTE-side radio bearer (RB) and a Radio Link Control (RLC) layer, and at the same time, may deliver the same information to a PDCP/RLC layer in an SL-side RB.

Here, the ProSe Priority per Packet (PPPP) of data delivered to the SL-side RB may maintain the priority of the received packet. When an SL-side RB that is mapped to the priority of the received packet does not exist, the UE-type RSU may autonomously configure a new RB that supports the priority and transmits the packet.

Hereinafter, a method of optimizing the utilization of radio resources is provided to overcome a problem occurring by the operation of SL Semi-Persistent Scheduling (SPS). The SPS is configured to reduce the delay time caused by an SL BSR-based resource allocation scheme when an RSU and UEs for vehicle communication operate based on mode 1 in which they are controlled by an eNB, including the situation that has been described in FIG. 7. More particularly, when two or more SL SPSs are configured and a plurality of SL SPSs corresponding to some or all of the two or more configured SL SPSs are activated, a method and apparatus for operating the SL SPS of the present invention will be described. Here, if a serving cell supports SL communication, the SL SPS may operate irrespective of a primary serving cell and a secondary serving cell.

Figure 8:
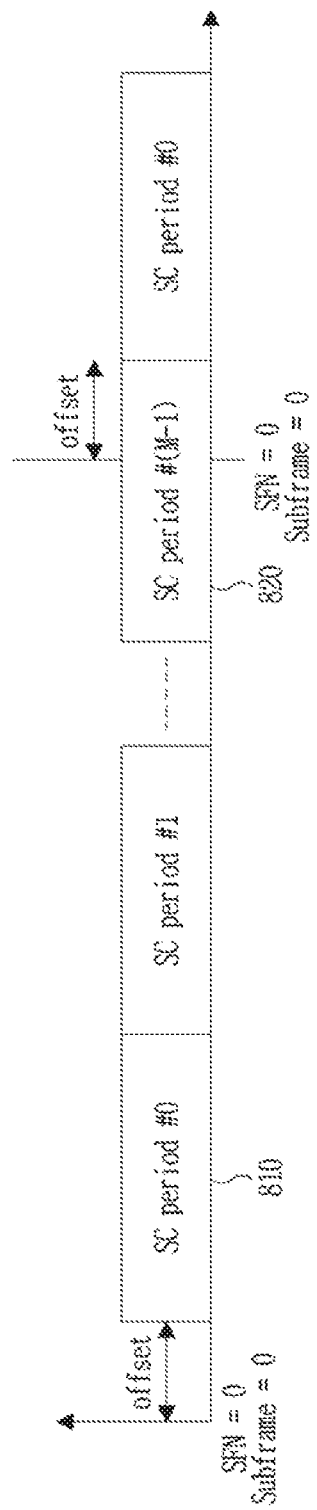
FIG. 8 is a diagram illustrating a semi-persistent resource scheduling method for a sidelink in a wireless communication system to which the present invention is applied.

FIG. 8 is a diagram illustrating a semi-persistent resource scheduling method for a sidelink in a wireless communication system to which the present invention is applied.

In mode 1, for SL SPS vehicle communication, an eNB configures the SPS-config for an SL through a Radio Resource Control (RRC) message and operates a separate resource allocation scheme for the SPS. The SPS-config for an SL includes configuration information used when a UE performs SL data transmission based on a radio resource allocated through SL SPS, or may be simply referred to as an SL SPS configuration. Also, the eNB may configure a plurality of pieces of RRC layer information (e.g., SPS-config for an SL or an SL SPS configuration) for a vehicle's SL SPS transmission, and may operate a separate SPS resource allocation scheme for each SL SPS configuration.

The transmission through SL SPS may be limited to a broadcast scheme. That is, vehicle communication data may be transmitted through SL SPS according to a broadcast scheme.

In some embodiments, a semi-persistent resource scheduling interval for a sidelink (semiPersistSchedIntervalSL) may be always set to '1'. Therefore, this may not be included in RRC configuration information.

Referring to FIG. 8, in association with a Sidelink Control (SC) period number, an SC period that starts after an offset value, which defines a start point of the SC period based on subframe number 0 in System Frame Number (SFN) 0, is defined as SC period number 0 810; an SC period number increases by 1 from SC period number 0. The offset value may be defined based on a subframe unit. The SC period number becomes 0 again after an SC period number having the maximum number 820. The SFN may be one of the values in the range of 0 to 1023, and the subframe number may be one of the values in the range of 0 to 9.

Based on radio resources allocated by SL SPS for a vehicle communication service, the eNB may determine configuration information for an SL data transmission with respect to each UE or UE-type RSU through an RRC message (e.g., an RRC reconfiguration message).

Figure 9:
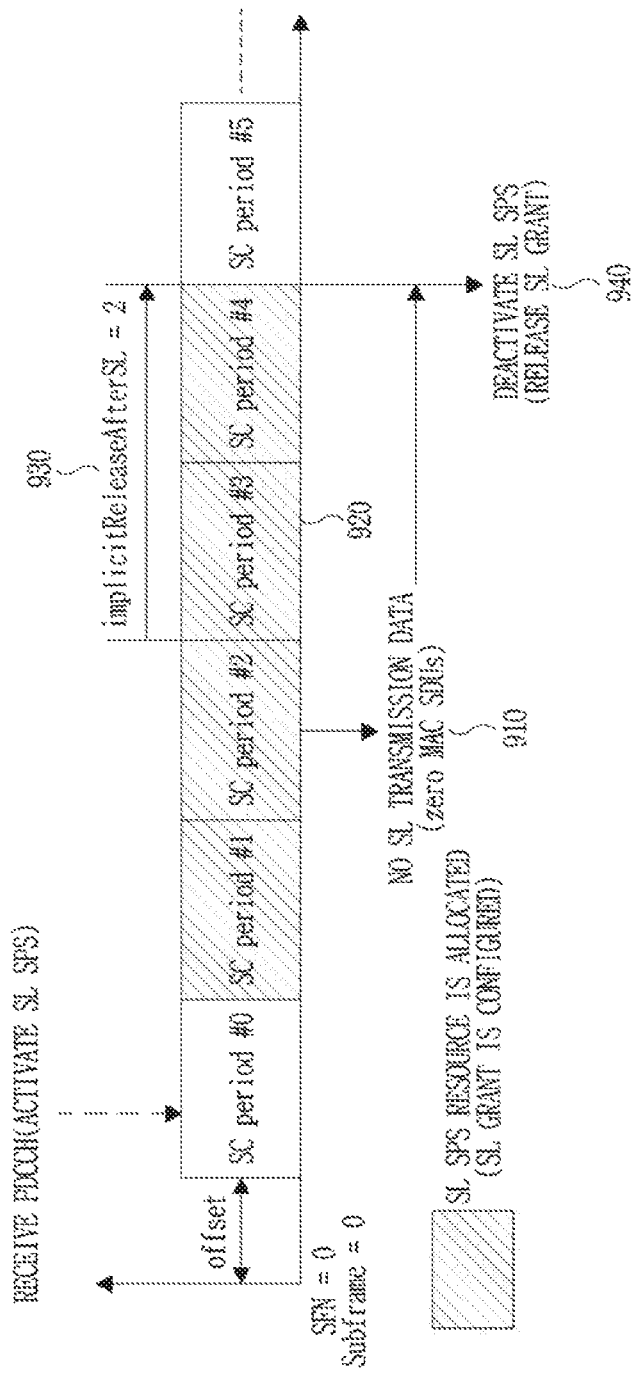
FIG. 9 is a diagram illustrating a method of scheduling a semi-persistent resource for a sidelink by an evolved node B (eNB) according to an embodiment of the present invention.

FIG. 9 is a diagram illustrating a method of scheduling a semi-persistent resource for a sidelink by an eNB according to an embodiment of the present invention.

As an example, "implicitReleaseAfterSL" may be defined as the maximum number of consecutive empty transmission SC periods that do not include SL transmission data for releasing an SPS configuration. A sidelink direct communication resource pool is configured on a semi-static basis using the layer 3 SL-CommResourcePool RRC message as defined in 3GPP TS36.331. The layer 1 physical resources, e.g., resource blocks and subframes, associated with the pool are partitioned into a sequence of repeating time periods, the sidelink control (sc) periods. Each sc period is a time period consisting of transmission of sideline control information (SCI) and its corresponding data. SCI includes the sidelink scheduling information, such as resource block assignment, modulation and coding scheme, group destination ID for sidelink communication, etc.

FIG. 9 shows how an SL grant configured by SL SPS may be released as shown in the diagram 940. First, a UE receives a Physical Downlink Control Channel (PDCCH) or Enhanced PDCCH (EPDCCH) indicating SL SPS activation, or receives a MAC Control Element (CE) indicating SL SPS activation whereby resources for SL SPS are allocated (that is, an SL grant is configured). Then, empty transmission occurs in consecutive SC periods, as many times as the maximum number defined by an eNB in all subframes of the SC periods. That is, when an SC period 920 including only the case 910 in which only Medium Access Control Protocol Data Units (MAC PDUs) (the new data including zero MAC Service Data Unit (SDU)) are generated, consecutively occurs as many times as the number 930 defined in 'implicitReleaseAfterSL' (two times in FIG. 9), the SL grant configured by SL SPS may be released as shown in the diagram 940. The SL grant release may be referred to as SL SPS deactivation. Here, the empty transmission is not actually transmitted through a Physical Sidelink Shared Channel (PSSCH). That is, when a MAC PDU (which is new data including zero MAC SDU) is configured in an MAC layer, the MAC layer does not transmit the MAC PDU to a physical layer. The zero MAC SDU indicates transmission of nothing when data (e.g., an RLC SDU) transferred from an RLC layer to an MAC layer does not exist (that is, when no data to be transferred exists) and the MAC layer is in a situation to send only a MAC sub-header without data.

Figure 10:
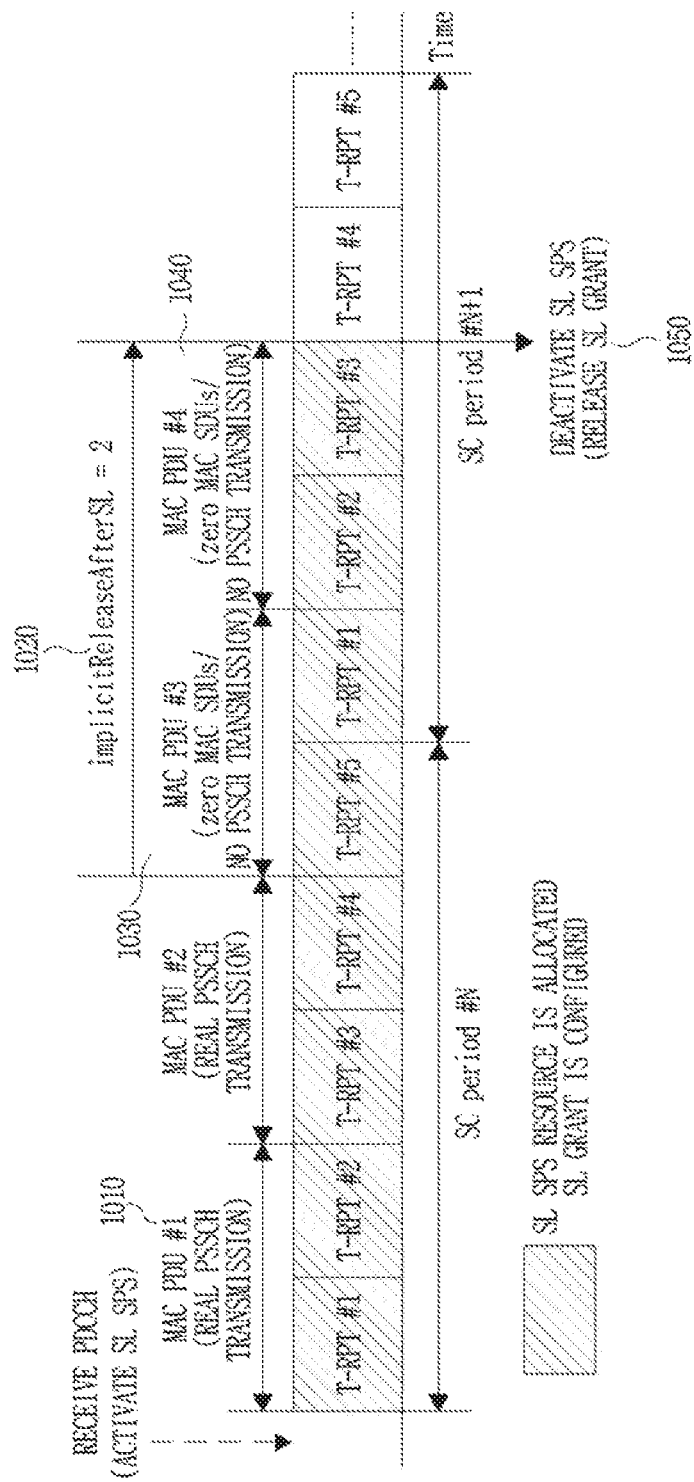
FIG. 10 is a diagram illustrating a method of scheduling a semi-persistent resource for a sidelink by an eNB according to another embodiment of the present invention.

FIG. 10 is a diagram illustrating a method of scheduling a semi-persistent resource for a sidelink by an eNB according to another embodiment of the present invention.

As another example, "implicitReleaseAfterSL" may be defined as the maximum number of consecutively omitted MAC PDU transmissions that do not include SL transmission data for cancelling an SPS configuration.

Referring to FIG. 10, after a UE receives either a PDCCH/EPDCCH indicating SL SPS activation or an MAC CE indicating SL SPS activation, when empty transmission occurs consecutively as many times as the maximum number defined by an eNB, that is, when MAC PDUs (i.e. new data including zero MAC SDU) are generated, an SL grant configured by SL SPS may be released. Here, the empty transmission may not be actually transmitted through a PSSCH. That is, when a MAC PDU is configured in an MAC layer, the MAC PDU is not transmitted to a physical layer.

In the MAC layer, an actual MAC PDU is configured based on a transmittable information bit length provided from the physical layer. The transmittable information bit length may be calculated in consideration of subframes in at least one available Time Resource Pattern for Transmission (T-RPT). For example, when four transmission opportunities exist, the length of information bit that is capable of transmitting a single MAC PDU may be calculated. When two transmission opportunities exist in a single T-RPT, a time resource 1010 of two T-RPTs is required for a single MAC PDU transmission. When the value of 'implicitReleaseAfterSL' is set to 2 as shown in the diagram 1020, two T-RPT durations may be counted as one duration as shown in the diagram 1030. Therefore, SL SPS may be released when two MAC PDUs are consecutively generated as new data including zero MAC SDU during four consecutive T-RPT durations, as shown in the diagram 1030 and 1040. That is, an SL grant configured by SL SPS may be released as shown in the diagram 1050. Here, T-RPT defines resources in the form of a pattern based on some periods, which are defined as the entire T-RPT duration from among subframes that an eNB sets as SL communication-allowed subframes. As an example, the entire T-RPT duration may be eight SL communication-enabled subframes. The T-RPT may include an entire duration value, the number of resources that are actually allocated to the entire duration, and information associated with a location of an actually allocated resource. As an example, a resource location may be defined based on a bitmap scheme. '0' indicates non-allocation and '1' indicates allocation. Time increases in a direction from the leftmost bit to the rightmost bit. In the above embodiments, when 'implicitReleaseAfterSL' is not configured by an eNB, a UE determines 'implicitReleaseAfterSL' to be '1'. Alternatively, when MAC PDUs, which are new data including zero MAC SDU, are generated, a UE immediately releases an SL grant without performing a counting operation associated with an 'implicitReleaseAfterSL' field. In association with an SL SPS operation defined as described above, the embodiments of the present invention will describe a method of supporting a plurality of SL SPS configurations with respect to a single UE.

A new method for individually indicating activation and deactivation of a plurality of SL SPS configurations of a single UE will be described as follows. Second, a new method for individually configuring or releasing SL grants with respect to a plurality of SL SPS configurations of a single UE will be described. Third, to provide control information for individual activation and deactivation of a plurality of SL SPS configurations of a single UE and/or to provide control information for configuring and releasing SL grants, a method of using a PDCCH/EPDCCH DCI and a new method of using a MAC control element (CE) will be described. Fourth, when a plurality of SL SPS configurations may exist for a single UE but the plurality of SL SPSs are not allowed to be activated at the same time, a new method for providing control information for SLS SPS activation and deactivation and/or control information for configuring and releasing SL grants will be described.

Figure 11:
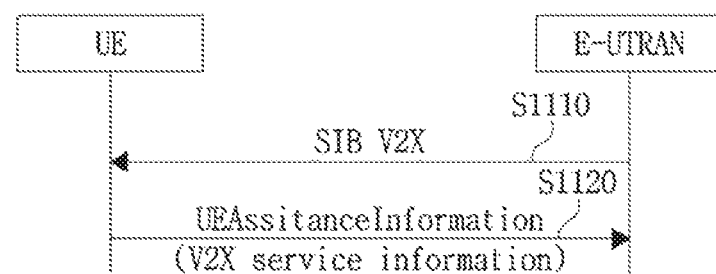
FIG. 11 is a diagram illustrating the operation of reporting user equipment (UE) assistance information according to the present invention.

FIG. 11 is a diagram illustrating an operation for reporting UE assistance information according to the present invention.

In operation S1110, a UE receives a system information block (SIB) including system information associated with V2X from an eNB (E-UTRAN). The SIB may be defined as a new SIB. In FIG. 11, the SIB may be called an SIB V2X. However, an SIB including system information related to V2X may be referred to using different terminologies other than SIB V2X. For example, the SIB V2X may be called SIB21, SIB22, or the like, to be distinguished from a legacy SIB.

A UE that receives an SIB V2X may recognize that data transmission/reception for a V2X service is allowed within the service area of a corresponding eNB. Also, the UE may determine V2X-related parameters to be used for the V2X service. The V2X-related parameters may include the transmission power to be transmitted through a PC5 link, information indicating whether it is allowed to set mode 2 (i.e., a mode in which a UE autonomously selects a radio resource of the PC5 link for V2X) and/or an exceptional mode, information associated with the transmission and/or reception resource set (i.e., a resource pool) usable in a set mode, and the like.

In the case when a UE is set to have an RRC connection with an eNB and operates based on mode 1 (i.e., a mode in which an eNB controls a radio resource of the PC5 link for V2X), when a condition for the UE to determine that the connection with the eNB has a problem is satisfied, or when a condition for the UE to declare radio link failure is satisfied, the exceptional mode may be a mode that temporarily allows the UE to autonomously select a radio resource when the UE starts an RRC reconfiguration procedure. The exceptional mode is a mode that temporarily allows the UE to autonomously configure radio resources. Subsequently, when a resource selection mode is not changed by the eNB and the condition that enables the UE to operate based on the exceptional mode is released, the exceptional mode is switched to mode 1 again.

Also, the SIB V2X may include information associated with a plurality of SL SPS configurations of a UE. In this instance, an eNB may not be aware of characteristics of SL communication performed between UEs. Thus, the eNB may receive, from a UE, information to be used for inferring the SL resource pattern required by the current UE, in order to determine the SL resource pattern required by the current UE for each of the plurality of SL SPS configurations.

As described above, the UE assistance information (UEAssistanceInformation) in operation S1120 may include information that the UE provides to the eNB for SL communication. The information that the UE provides to the eNB may be V2X service information.

For example, V2X service information that is currently activated may be provided to the eNB. V2X service information may include the transmission of a Basic Safety Message (BSM) including information related to the safety of a vehicle, or the transmission of a Cooperative Awareness Message (CAM) including state information (e.g., time, location, movement state, and the like) of a vehicle in an intelligent traffic network system. Two or more services may be activated at the same time, and thus a plurality of pieces of V2X service information may be included in report information.

An eNB that receives V2X service information from a plurality of UEs (or vehicles) may determine an appropriate SL SPS out of the SL SPSs that are currently configured for each of the UEs. When an appropriate SL SPS configuration for supporting a currently required V2X service does not exist among the SL SPS configuration information configured for each UE, the eNB may determine the configuration of an additional SL SPS.

According to an embodiment of the present invention, a separate Radio Network Temporary Identity (RNTI) may be used for SL SPS. The separate RNTI may be defined as an SPS SL-RNTI.

Here, when a plurality of SL SPS configurations exist for a single UE, an SPS SL-RNTI may be allocated to each of the plurality of SL SPS configurations. That is, the eNB may randomly select, as an SPS SL-RNTI value, one of the values in the range defined as shown in Table 1 provided below, and may configure a single SPS SL-RNTI for each SL SPS configuration. That is, the eNB may inform a UE in advance of an SPS SL-RNTI value mapped for each SL SPS configuration, through an RRC message or the like.

TABLE 1

| Value (hexa-decimal) | RNTI |
|---|---|
| 0000 | N/A |
| 0001-003C | RA-RNTI, C-RNTI, Semi-Persistent Scheduling C-RNTI, Semi-Persistent Scheduling SL-RNTI, Temporary C-RNTI, eIMTA-RNTI, TPC-PUCCH-RNTI, TPC-PUSCH-RNTI and SL-RNTI, G-RNTI |
| 003D-FFF3 | C-RNTI, Semi-Persistent Scheduling C-RNTI, Semi-Persistent Scheduling SL-RNTI, eIMTA-RNTI, Temporary C-RNTI, TPC-PUCCH-RNTI, TPC-PUSCH-RNTI and SL-RNTI, G-RNTI |
| FFF4-FFF9 | Reserved |
| FFFA | SC-N-RNTI |
| FFFB | SC-RNTI |
| FFFC | CC-RNTI |
| FFFD | M-RNTI |
| FFFE | P-RNTI |
| FFFF | SI-RNTI |

An SPS SL-RNTI may be used for determining SL SPS resource control information that the eNB allocates for each SL SPS configuration. For example, the UE determines an SL SPS configuration to which control information (i.e., SL SPS activation/deactivation indicator information), which indicates SL SPS activation or deactivation and is received through a PDCCH/EPDCCH DCI or MAC CE, is to be applied, based on an SPS SL-RNTI value. When the SL SPS activation/deactivation indication information indicates activation, the UE may store SL grant information provided through the PDCCH/EPDCCH DCI or MAC CE, and may determine that an SL grant is configured.

SL grants may be configured through the following procedure based on the RRC configuration information.

An example in which SL SPS activation/deactivation indication information is provided through a PDCCH/EPDCCH will be described.

When SL SPS activation/deactivation indication information in a received PDCCH/EPDCCH indicates activation, a UE stores SL grant information provided through the PDCCH/EPDCCH and determines that an SL grant is configured.

DCI included in the PDCCH/EPDCCH is DCI for an SL newly introduced for vehicle communication, and SL SPS activation/deactivation indication information may be included in the DCI. For example, when the SL SPS activation/deactivation indication information is '1', this indicates activation. When the SL SPS activation/deactivation indication information is '0', this indicates deactivation (SL grant release).

In Table 1, a PDCCH/EPDCCH including DCI for the SL and an SL SPS-related field may be available only when it is Cyclic Redundancy Check (CRC), scrambled (or masked) with an SPS SL-RNTI.

Next, an example in which SL SPS activation/deactivation indication information is provided through a MAC CE will be described.

To obtain information transmitted through the MAC CE, a UE may determine scheduling information associated with the MAC CE (e.g., physical resource information to which a Physical Downlink Shared Channel (PDSCH) including a MAC CE is mapped) through PDCCH/EPDCCH DCI. A PDCCH/EPDCCH including scheduling information associated with the MAC CE may be scrambled/masked with a C-RNTI, and a UE may decode the PDCCH/EPDCCH based on the C-RNTI. Here, the PDCCH/EPDCCH DCI including the scheduling information associated with the MAC CE may be PDCCH/EPDCCH DCI including DL grant information (or DL assignment information) that schedules a downlink transmission from an eNB to a UE, unlike the above described PDCCH/EPDCCH DCI including SL activation/deactivation information and/or SL grant information. That is, the UE that decodes the PDCCH/EPDCCH DCI including the DL grant information may receive a MAC CE transmitted through a PDSCH on a resource indicated by the DL grant information, may deliver the received MAC CE to a MAC layer, and may determine the contents thereof.

The SL SPS activation/deactivation indication information may be transmitted through a MAC CE. The MAC CE information may be configured as a message having a variable length of 16 to 72 bits included in a MAC payload, or may be configured as a message having a fixed length of 20, 24, 28, or 32 bits. Alternatively, the MAC CE information may be transmitted together with a corresponding MAC subheader, and the MAC subheader may be included in the MAC header of a MAC PDU. A MAC PDU format according to the present invention will be described in detail with reference to FIGS. 12 to 16.

Through Logical Channel ID (LCD) information included in the MAC subheader, a UE may determine whether a corresponding MAC CE is SL SPS activation/deactivation indication information. For example, when an LCID value is '10111', this may indicate SL SPS activation. When the LCID value is '10110', this may indicate SL SPS deactivation.

16 bits of the message included in the MAC payload may have an SPS SL-RNTI value. Accordingly, a UE may determine an SL SPS configuration to which activation or deactivation is to be applied from among a plurality of SL SPS configurations, based on the SPS SL-RNTI.

Additionally, SL grant information having a length of 16, 20, or 24 bits may be included in the MAC CE. Alternatively, the length of the SL grant information may have a length of a multiple of 8.

Table 2 illustrates an example of information included in SL grant. The SL grant information as shown in Table 2 may be included in the DCI of a PDCCH/EPDCCH, or may be included in a MAC CE. For example, the SL grant may correspond to DCI format 5.

TABLE 2

| DCI contents | Field size |
|---|---|
| Resource for PSCCH | 6 |
| Group destination ID | 8 |
| Timing advance indication | 11 |
| MCS (Modulation and coding scheme) | 5 |
| TPC command for PSCCH and PSSCH | 1 |
| Frequency hopping flag | 1 |
| Resource block assignment and hopping resource allocation | $\lceil \log_2 (N_{RB}^{SL} (N_{RB}^{SL} + 1)/2) \rceil$ |
| Time resource pattern | 7 |
| Total size (bit) | 39 + $\lceil \log_2 (N_{RB}^{SL} (N_{RB}^{SL} + 1)/2) \rceil$ |

The DCI content fields of Table 2 may be arranged from Most Significant Bit (MSB) to Least Significant Bit (LSB), but field arrangements are not limited thereto. Also, some or all of the DCI content fields of Table 2 may be included as SL grant information, an additional field that is not included in Table 2 may be further included, and the sequence in which the fields are listed may not be limited to this sequence.

The SL grant in the example of Table 2 may include a 6-bit Resource-for-PSCCH field, an 8-bit Group destination ID field, an 11-bit Timing Advance Indication field, a 5-bit Modulation-and-Coding-Scheme (MCS) field, a 1-bit TPC-command-for-PSCCH-and-PSSCH field, a 1-bit frequency-hopping-flag field, a $\lceil \log_2(N_{RB}^{SL}(N_{RB}^{SL}+1)/2 \rceil$-bit Resource-block-assignment-and-hopping-resource-allocation field, and a 7-bit time-resource-pattern field. In this instance, the size of the SL grant may be $39+\lceil \log_2(N_{RB}^{SL}(N_{RB}^{SL}+1)/2 \rceil$.

Here, $N_{RB}^{SL}$ may be determined based on a bandwidth supported by a corresponding system. For example, in an LTE system, $N_{RB}^{SL}$ may be given as one of the values in the range of 6 through 100. The value may indicate the maximum number of resource blocks (RB) that are allocable for a V2X service in the corresponding system. An eNB in the corresponding system may report the same to all UEs through system information using a broadcast transmission scheme. The maximum number of RBs may be expressed using an index of an RB resource configured for V2X service. For example, in a system having a bandwidth formed of 100 consecutive RBs based on the frequency axis, the index of an RB existing in the lowest frequency band may be set to 0 and the index of an RB existing in the highest frequency band may be set to 99. In this instance, RB resources configured for the V2X service may be expressed as RB indices x to y, and information actually reported to a UE may include only x and y information. In this instance, x and y are integers that are greater than or equal to 0 and less than or equal to 99, and x is an integer that is always smaller than y. Therefore, the maximum number of RBs may be calculated based on y-x.

When it is assumed that V2X data transmitted through a PC5 interface is always in the broadcast form, a group destination ID field may be excluded from the DCI contents.

Also, because a UE may receive resource allocation information associated with SL SPS in the state in which the UE is connected to an eNB, the UE may already obtain timing-advance-related information from the eNB. Therefore, the timing-advance-indication field may be excluded from the DCI contents.

Further, an eNB may not dynamically react to control transmission power in view of a characteristic of SPS, and thus the effect of transmission power control by the eNB may be insignificant. Therefore, the TPC-command-for-PSCCH-and-PSSCH field may be excluded from the DCI contents.

FIGS. 12 through 16 are diagrams illustrating the configuration of a MAC PDU according to the present invention.

A MAC PDU may include a MAC header and a MAC payload. The MAC header may include one or more MAC subheaders. The MAC payload may include one or more MAC SDUs (or MAC CEs), and may further include padding as needed. Here, one MAC subheader corresponds to a MAC SDU (or MAC CE) or one padding. That is, a plurality of MAC subheaders may be arranged in the same order as the sequence in which MAC SDUs (or MAC CEs) and paddings are arranged.

Figure 12:
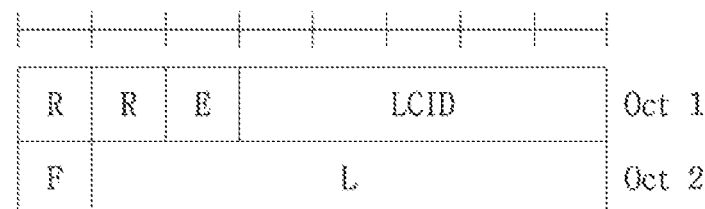

A normal MAC subheader may include six header fields R/R/E/LCID/F/L as shown in FIGS. 12 and 13, and the last MAC subheader may include four header fields R/R/E/LCID as shown in FIG. 14. FIG. 14 illustrates an example of the format of a MAC CE.

In the examples of FIGS. 12 through 16, Oct denotes an octet and is configured in order Oct1, Oct2, Oct3, . . . , and the like.

R denotes a reserved bit.

E denotes whether another subheader exists in the MAC header after a corresponding subheader. When the value of E bit is '1', this indicates that another subheader exists. When the value of E bit is '0', a MAC SDU, a MAC CE, or a padding starts from a subsequent bit.

An LCID may have a value indicating a type of a MAC CE or the logical channel of a MAC SDU corresponding to a MAC subheader. According to an embodiment of the present invention, the value of a LCID of a MAC subheader indicates whether MAC CE information corresponding to the MAC subheader is for SL SPS activation or for SL SPS deactivation. For example, when the LCID value is '10111', this may indicate SL SPS activation. When the LCID value is '10110', this may indicate SL SPS deactivation.

F denotes a bit indicating the size of an L field. When the value is '0', this indicates that a 7-bit L field exists as shown in FIG. 12. When the value is '1', a 15-bit L field exists as shown in FIG. 13.

An L field may have a value indicating the size of a MAC SDU (or MAC CE) corresponding to a MAC subheader.

Figure 15:
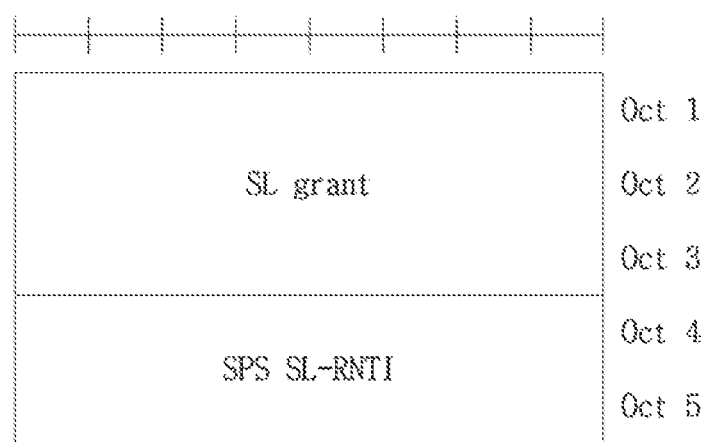

A MAC SDU (or MAC CE) as shown in FIG. 15 may include SL grant information and SPS SL-RNTI information.

An SL grant may include various fields as described in Table 2. Although it is simply expressed as SL grant in FIG. 15, this may indicate one or more pieces of SL grant information and SL SPS activation/deactivation indication information.

An SPS SL-RNTI may have an SPS SL-RNTI value that is mapped to one of a plurality of SL SPS configurations. That is, a UE may determine an SL SPS configuration which SL grant information is related to, based on the SPS SL-RNTI value included in the MAC SDU (or MAC CE). Here, the order of the SL grant and the SPS SL-RNTI may not be limited, and the SPS SL-RNTI may be located before or after the SL grant.

When the size of the SL grant in FIG. 15 is variable, a MAC subheader from FIG. 12 or 13 may be used. When the size of the SL grant in FIG. 15 is fixed, a UE may be aware of the size of a MAC SDU (or MAC CE) including the SL grant, without using an L (length) filed in the MAC subheader, and thus a MAC subheader from FIG. 14 may be used.

An additional embodiment of the present invention allocates a single SPS SL-RNTI to each UE, instead of allocating the same to each SL SPS configuration. That is, an eNB may randomly select one of the values in the range defined as shown in Table 1 as an SPS SL-RNTI value, and may configure a single SPS SL-RNTI for each UE.

Here, a plurality of SL SPS configurations exist for a single UE, and index indicators for distinguishing the plurality of SL SPS configurations may be included in the corresponding SL SPS configuration information (e.g., RRC messages). The index indicator ("SL SPS index indicator") may be expressed as, for example, an SL_SPS_Index, and may have an integer value. The value of the SL_SPS_Index may be given as, for example, one of the values in the range of 0 through 7. That is, eight different SL SPS configurations may be configured for a single UE, and activation or deactivation of the eight SL SPS configurations may be individually indicated. The maximum number of SL SPS configurations that are allowed to be activated at the same time, 8, is equal to the maximum number of HARQ processes configurable in an LTE FDD system, because the SL SPS configuration activated at the same time may need to transmit data through distinguished Hybrid Automatic Repeat reQuest (HARQ) processes. However, when the maximum number of HARQ processes configurable in a next generation mobile communication system has a different value, the maximum number of SL SPS configurations may be changed and defined as the corresponding value. For example, when a time period during which a single HARQ operation is performed is defined as X ms, the maximum number of HARQ processes may be defined by the maximum number of Time-To-Intervals (TTI) definable in X ms. A link that defines the maximum number of HARQ processes may be determined based on either the uplink and the downlink of a corresponding mobile communication system, or may be determined for each of the uplink and the downlink. A sidelink that is a D2D communication link may have a different value based on a link through which transmission is to be performed from among either the uplink or the downlink.

The SL_SPS_index value may be provided through PDCCH/EPDCCH DCI or may be provided through a MAC CE.

Table 3 shows an example of setting the value of a predetermined field for each DCI format, for the validation of an SPS activation PDCCH/EPDCCH. According to the present invention, a predetermined field in a DCI format of the SPS activation PDCCH/EPDCCH may be reused, or a new field will be added and used as an SL_SPS_index. The SPS activation PDCCH/EPDCCH is scrambled with an SPS SL-RNIT configured for each UE, and is transmitted. This indicates that the SPS activation PDCCH/EPDCCH is for SL SPS.

Table 3 provided below illustrates an example of reusing Modulation-and-coding-scheme-and-redundancy-version of DCI format 0 and a Modulation-and-coding-scheme field of DCI format 1/1A, for indicating an SL_SPS_index value.

Resource block assignment and hopping resource allocation

In the case of PSSCH hopping, $(\lceil \log_2(N_{RB}^{SL}(N_{RB}^{SL}+1)/2 \rceil - N_{SL\_hop})$ bits Otherwise, $(\lceil \log_2(N_{RB}^{SL}(N_{RB}^{SL}+1)/2 \rceil)$ bits Time resource pattern—7 bits SL SPS activation/deactivation—1 bit SL_SPS_Index—3 bits Alternatively, a new DCI format for SL SPS, which is different from the legacy DCI format, may be defined. The DCI format may include one or more of the SL grant fields in Table 2, and may further include an SL_SPS_Index field and a new field indicating SL SPS activation or deactivation.

As an additional method of providing SL SPS activation control information through a MAC CE, a method of transmitting an SL_SPS_Index field instead of an SPS SL_RNTI field may be used.

Figure 16:
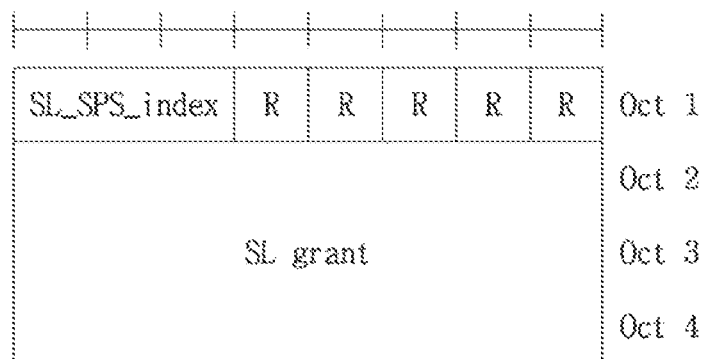

Alternatively, as illustrated in FIG. 16, a MAC SDU (or MAC CE) may include SL_SPS_Index information and SL grant information.

Specifically, as illustrated in FIG. 16, a single octet may include a 3-bit SL_SPS_Index field and 5 pieces of R-bit. Although it is simply expressed as SL grant in FIG. 16, this may indicate one or more pieces of SL grant information and SL SPS activation/deactivation indication information. Also, the order of the SL_SPS_Index and the SL grant is not limited, and the SPS SL-RNTI may be located before or after the SL grant. When the size of the SL grant in FIG. 16 is variable, a MAC subheader from FIG. 12 or 13 may be used. When the size of the SL grant in FIG. 16 is fixed, a UE may be aware of the size of a MAC SDU (or MAC CE) including the SL grant, without using an L (length) filed from the MAC subheader, and thus a MAC subheader from FIG. 14 may be used.

Although a plurality of SL SPS configurations are determined for a single UE at the same time, as described in the above examples, there may be a case in which another V2X

TABLE 3

|  | DCI format 0 | DCI format 1/1A | DCI format 2/2A/2B/2C/2D |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' and left 4 bits set to 'SL_SPS_Index' | N/A | N/A |
| HARQ process number | N/A | FDD: set to '000' TDD: set to '0000' | FDD: set to '000' TDD: set to '0000' |
| Modulation and coding scheme | N/A | MSB is set to '0' and left 4 bits set to 'SL_SPS_Index' | For the enabled transport block: MSB is set to '0' |
| Redundancy version | N/A | set to '00' | For the enabled transport block: set to '00' |

Although the example of Table 3 illustrates a method for allocating four bits as an SL_SPS_index, a method for allocating three bits from an LSB as an SL_SPS_Index may be used for DCI format 0 and 1/1A.

Alternatively, an SL_SPS_index field and a new field indicating SL SPS activation or deactivation may be further included in legacy DCI format 5 indicating an SL grant. Therefore, fields in DCI format 5 may be as follows.

Resource for PSCCH—6 bits

TPC command for PSCCH and PSSCH—1 bit

Frequency hopping flag—1 bit service is added or a resource for data transmission is additionally required. In this instance, although a resource exists which is allocated to an SL SPS configuration that has already been activated for transmission (or broadcasting) to an identical destination group, additional resource allocation may be needed temporarily or during a predetermined period of time. Alternatively, a data transmission having a period shorter than an SL SPS period may be required during a predetermined period of time.

In the above described examples of the present invention, a plurality of SL SPS configurations (e.g., SL SPS configurations #0, #1, #2, #3, #4, #5, #6, and #7) may exist for a single UE. In the state in which some (e.g., SL SPS configuration #1) of the plurality of SL SPS configurations are activated, when other SL SPS configurations (e.g., SL SPS configuration #3) are activated, a plurality of SL SPS configurations (e.g., SL SPS configurations #1 and #3) may be activated.

Meanwhile, a plurality of SL SPS configurations may not be activated at the same time, and the activation of a single SL SPS configuration may be allowed at an arbitrary point in time. In this instance, to allocate an additional resource to a resource that has been allocated for a currently activated SL SPS configuration, an SL grant associated with the already activated SL SPS configuration is released (SL SPS deactivation) and an SL grant is provided through resource allocation through a PDCCH/EPDCCH DCI or MAC CE. Therefore, new SL SPS configurations may be determined. Every time that an additional resource allocation is needed, an SL grant that has already been activated is released (SL SPS deactivation) and a new SL SPS configuration may be determined by providing control information through a PDCCH/EPDCCH DCI or MAC CE. In this instance, a message for releasing the already activated SL grant (or SL SPS deactivation) needs to be transmitted, and thus signaling overhead may be increased.

To overcome the increase of the signaling overhead, an additional example of the present invention defines that a new SL SPS activation indication implicitly indicates the deactivation of an already activated SL SPS configuration.

For example, in the state in which a first SL SPS configuration is activated, a UE that receives control information for activating a second SL SPS configuration (e.g., control information provided through PDCCH/EPDCCH DCI or MAC CE as shown in the above examples of the present invention) may deactivate the first SL SPS configuration at a point in time when the second SL SPS configuration is activated, although the UE will not receive deactivation indication information associated with the first SL SPS configuration.

Here, the first SL SPS configuration may be an SL SPS configuration corresponding to the value of a first SPS SL-RNTI, and the second SL SPS configuration may be an SL SPS configuration corresponding to the value of a second SPS SL-RNTI. Alternatively, the first SL SPS configuration may be an SL SPS configuration corresponding to the value of a first SL_SPS_index, and the second SL SPS configuration may be an SL SPS configuration corresponding to the value of a second SL_SPS_index.

Different (or independent) SL SPS resources may be allocated to a plurality of SL SPS configurations (e.g., SL SPS configuration #0, #1, #2, #3, #4, #5, #6, and #7) configured for a single UE. In this instance, according to the above described example, through the implicit deactivation of an already-activated SL SPS configuration (e.g., SL SPS configuration #1) and the activation of a new SL SPS configuration (e.g., SL SPS configuration #3), an SL SPS resource allocated to the UE may be changed. When the activation of the plurality of SL SPS configurations at the same time is supported, and SL SPS configuration #3 is activated additionally in the state in which SL SPS configuration #1 is activated, this leads to a result different from the result obtained when resources corresponding to a union of SL SPS resources allocated to SL SPS configurations #1 and #3 are allocated to the UE.

One (e.g., SL SPS configuration #3) of a plurality of SL SPS configurations (e.g., SL SPS configurations #0, #1, #2, #3, #4, #5, #6, and #7) configured for a single UE may include all of another configuration (e.g., SL SPS configuration 31). In this instance, the SL SPS resources which are allocated to the UE as a result of the implicit deactivation of an already-activated SL SPS configuration (e.g., SL SPS configuration #1) and the activation of a new SL SPS configuration (e.g., SL SPS configuration #3), are the same as the SL SPS resources which are allocated to the UE when the activation of a plurality of SL SPS configurations at the same time is supported and when SL SPS configuration #3 is additionally activated in the state in which SL SPS configuration #1 is already activated.

That is, depending on the method of allocating an SL SPS resource corresponding to an SL SPS configuration, a scheme of allowing the activation of a plurality of SL SPS configurations at the same time and a scheme of allowing the activation of a single SL SPS at an arbitrary point in time are different from each other. However, SL SPS resources allocated to a UE, as a result of the scheme, may be operated in the same manner.

Also, when an SL grant configured by SL SPS is released according to FIG. 9, FIG. 10, and the condition of the 'implicitReleaseAfterSL' value is not configured, the release of the SL grant configured by SL SPS for V2X may be reported through a UE assistance information reporting procedure which has been described in FIG. 11. Here, when a plurality of SL SPS configurations are activated, at least one SL SPS from which the SL grant is released and of which SL grant release is reported may exist at the same time. Accordingly, information indicating an SL SPS configuration from which the SL grant is released may be included in a signal in the UE assistance information reporting procedure and may be transmitted to an eNB. Here, the information indicating an SL SPS configuration from which the SL grant is released may be an SPS SL-RNTI, which has been described in an embodiment of the present invention, or an SL_SPS_index value, which has been described in another embodiment of the present invention. A signal for reporting the UE assistance information may be defined in the RRC layer, which is Layer 3 signaling, because a change in the information related to V2X service and the generation of an SL SPS configuration from which the SL grant is released do not frequently occur.

In the situation in which a plurality of SL SPS configurations are activated, at least one SL SPS from which an SL grant release is reported may exist at the same time. In this instance, an SPS SL-RNTI or SL_SPS_Index value corresponding to the SL SPS from which the SL grant release is reported may be configured as a list in the RRC signaling, and may be transmitted to an eNB.

In the case of a system where the occurrence of an SL SPS configuration from which an SL grant is released is more frequently observed than the change of V2X service-related information because the number of SL SPS configurations is high, the system may configure SL SPS configuration information from which an SL grant is released, in the form of a MAC CE that is a MAC layer signaling, separately from the V2X service-related information change report, and the system may transmit the same. In this instance, a UE may indicate that the corresponding MAC CE information is information indicating the release of an SL grant by SL SPS, through an LCID value indicating SL grant release, and may transmit an SPS SL-RNIT or SL_SPS_Index field through the MAC CE information in a payload. The SPS SL-RNTI or SL_SPS_index field, which is a field remaining after excluding the SL grant field from the MAC CE of FIG. 15 and FIG. 16, may be included in the MAC CE in the payload.

In the situation in which a plurality of SL SPS configurations are activated, at least one SL SPS from which an SL grant is released and reported, may exist at the same time. Therefore, to indicate the same, a plurality of SP SL-RNTI or SL_SPS_Index fields may be included in the MAC CE (which corresponds to a single LCID) in the payload, and may have a variable length. Therefore, an LCID format may have the format illustrated in FIG. 12 or in FIG. 13 to support a variable length. In the case of the SL_SPS_index field, the length is not a multiple of 8. Accordingly, how many SL_SPS_Index fields are included may not be accurately identified through the L field. Therefore, to indicate the same, a 3-bit indicator indicating the number of SL SPS index fields may be included in the first location of the MAC CE (which corresponds to a single LCD) in the payload. In this instance, the length of the MAC CE may be identified through the indicator that indicates the number of SL_SPS_Index fields, and thus the LCID format may have the format illustrated in FIG. 14, which supports a fixed length.

As another example, only an SPS SL_RNTI or SL_SPS_Index field may be included in the MAC CE (which corresponds to a single LCID) in the payload. Therefore, the LCID format may comply with the format in FIG. 14 that supports a fixed length, and may include a plurality of MAC CEs in a single MAC PDU when a plurality of events occur that need to be reported.

Figure 17:
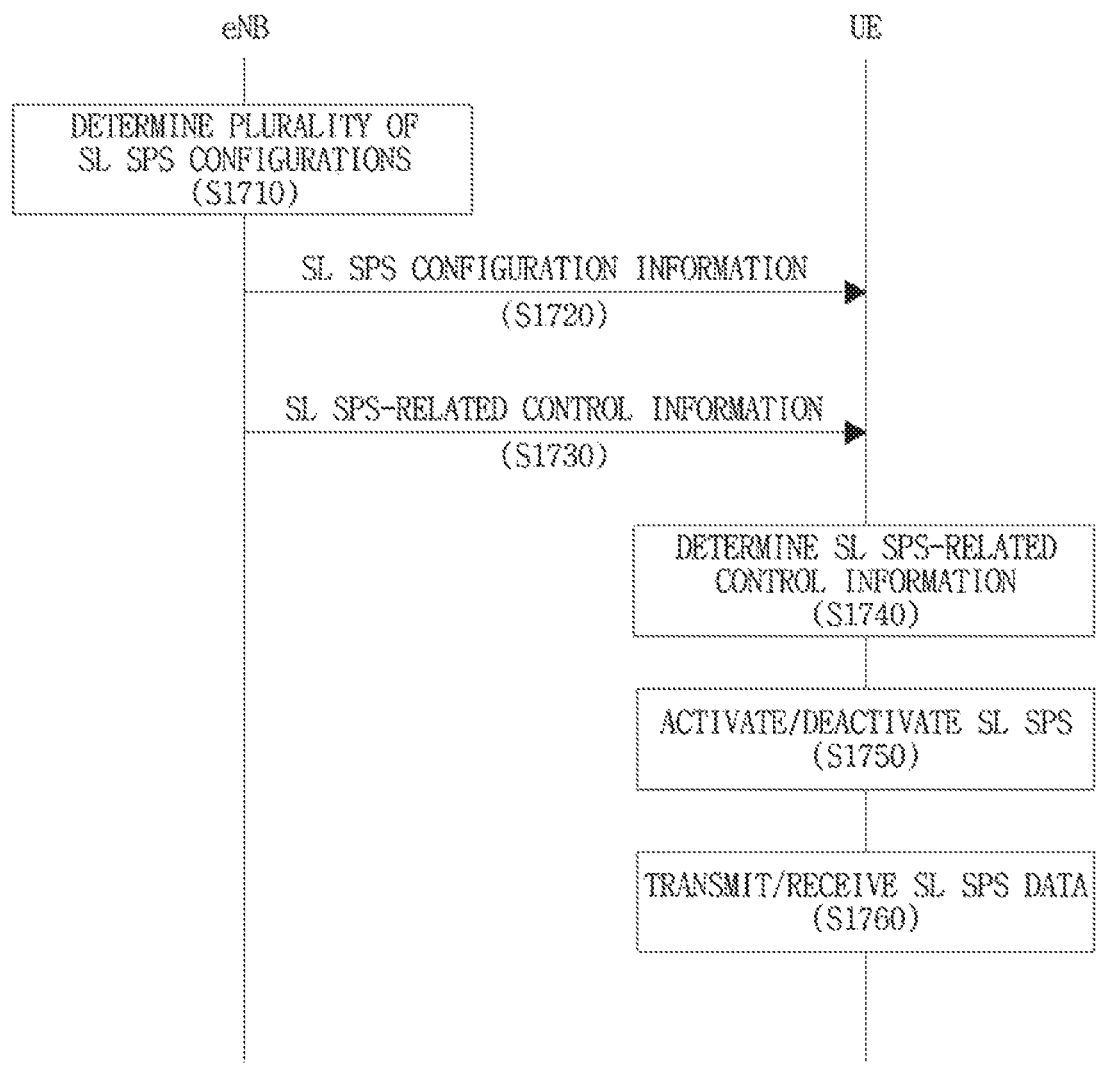
FIG. 17 is a flowchart illustrating the operations of an eNB and a UE according to the present invention.

FIG. 17 is a flowchart illustrating the operations of an eNB and a UE according to the present invention.

Before performing operation S1710 in FIG. 17, an eNB provides a UE with V2X-related system information in operations S1110 and S1120 in FIG. 11, and the UE provides an eNB with information required for beginning the transmission/reception of V2X data on the PC5 link in the form of V2X service information, based on the V2X-related system information. The V2X service information may include information related to BSM, CAM, and the like as described in FIG. 11, and may further include information, such as a V2X service list, an SL BSR, a V2X BSR, or the like. Such information may be provided to the eNB at the same time or at different points in time.

In operation S1710, the eNB determines that the UE requires a periodic SL data transmission/reception such as a vehicle communication service, based on the V2X service-related information received from the UE, and accordingly, the eNB may determine a plurality of SL SPS configurations to be configured for the corresponding UE.

In operation S1720, the eNB transmits an RRC reconfiguration message including SL SPS configuration information to the UE. Here, a plurality of SL SPS configurations may be configured for a single UE, and SL SPS configuration information may include information for allocating individual identification information (e.g., SPS SL-RNTI or SL_SPS_Index) with respect to the plurality of SL SPS configurations.

For example, when each UE has a single SPS SL-RNTI, the SL SPS configuration information may be defined by the structure of Table 4. A plurality of SL SPS configurations are configured in the form of a list, and a single SPS SL-RNTI is configured for all of the configurations in the list.

TABLE 4

```
SL_SPS-Config ::=         SEQUENCE {
  semiPersistSchedSL-RNTI   C-RNTI,
  sps-ConfigSLList          SEQUENCE (SIZE
                            (1..maxSL_HARQ)) OF SPS-ConfigSL
```

TABLE 4-continued

```
}
SPS-ConfigSL ::=          CHOICE {
  release                   NULL,
  setup                     SEQUENCE {
    SL_SPS_Index              INTEGER (0..7),
    semiPersistSchedIntervalSL ENUMERATED {
                                1, 2, 3, 4, 6, 8,
                                12, 16, 32, 64, spare6,
                                spare5, spare4, spare3, spare2,
                                spare1},
    implicitReleaseAfterSL     ENUMERATED (e1, e2, e3, e4,
                                e8),
  ]]
  }
}
```

As another example, when each SL SPS configuration has a single SPS SL-RNTI, the SL SPS configuration information may be defined by the structure of Table 5.

TABLE 5

```
SL_SPS-Config ::=         SEQUENCE {
  sps-ConfigSLList          SEQUENCE (SIZE (1..maxSL_HARQ)) OF
                            SPS-ConfigSL
}
SPS-ConfigSL ::=          CHOICE {
  release                   NULL,
  setup                     SEQUENCE {
    semiPersistSchedSL-RNTI   C-RNTI,
    semiPersistSchedIntervalSL ENUMERATED {
                                1, 2, 3, 4, 6, 8,
                                12, 16, 32, 64, spare6,
                                spare5, spare4, spare3, spare2,
                                spare1},
    implicitReleaseAfterSL     ENUMERATED {e1, e2, e3, e4, e8},
  ]]
  }
}
```

In operation S1730, the eNB transmits SL SPS-related control information to the UE. The SL SPS-related control information may include one or more of SL SPS activation/deactivation indication information and SL grant information. For example, the eNB may determine a point in time when the UE requires a periodic SL data transmission/reception based on information received from the UE, such as SL BSR, or the like, and may provide SL SPS-related control information to the UE at the determined point in time. Also, the SL SPS-related control information may be provided through a PDCCH/EPDCCH DCI or a MAC CE. The SL SPS-related control information may include at least one piece of the information in Table 2.

In operation S1740, the UE determines the SL SPS-related control information from the eNB.

For example, the UE attempts to receive a PDCCH/EPDCCH based on each SPS SL-RNTI value of the SL SPS configuration information configured through the RRC reconfiguration procedure or the like in operation S1720, in order to determine whether a PDCCH/EPDCCH DCI, which is transmitted by the eNB and which includes activation indication information associated with a predetermined SL SPS configuration, exists. When a PDCCH/EPDCCH that is scrambled or masked with an SPS SL-RNTI value is successfully decoded, the UE may determine the SL SPS-related control information (e.g., one or more of the activation indication information and an SL grant for an SL SPS configuration) included in the DCI received through the corresponding PDCCH/EPDCCH.

Also, the UE may attempt to receive a PDCCH/EPDCCH based on a C-RNTI value, may receive a PDSCH on a PDSCH resource indicated by DCI included in the PDCCH/EPDCCH, and may determine SL SPS-related control information for a predetermined SL SPS configuration (e.g., one or more out of the activation indication information and the SL grant for an SL SPS configuration) based on the SPS SL-RNTI information or the SL_SPS_index information included in a MAC CE received through the PDSCH.

When the UE determines that the SL SPS-related control information provided from the eNB is for the predetermined SL SPS configuration, the UE may activate the predetermined SL SPS configuration based on the SL SPS-related control information in operation S1750. The activation of the SL SPS configuration may include an operation for determining a resource for transmitting/receiving SL SPS data based on the SL grant information included in the SL SPS-related control information received in operation S1730. Also, the activation of the SL SPS configuration may include the operation for activating a new SL SPS configuration in addition to an SL SPS configuration which has already been activated, thereby activating a plurality of SL SPS configurations. Alternatively, when the activation of only a single SL SPS configuration is supported at an arbitrary point in time, the activation of the SL SPS configuration may include an operation for deactivating an SL SPS configuration which has already been activated by the activation of the SL SPS configuration, and for activating a new SL SPS configuration.

When the UE determines that the SL SPS-related control information received in operation S1730 includes information indicating the deactivation of a predetermined SL SPS configuration in operation S1740, the UE may deactivate the predetermined SL SPS configuration in operation S1750. Alternatively, in the case in which the activation of only a single SL SPS configuration is supported at an arbitrary point in time, when the UE determines activation indication information associated with a new SL SPS as opposed to the predetermined SL SPS configuration that is currently activated, instead of determining the explicit indication of the deactivation of the predetermined SL SPS configuration, the UE may deactivate the SL SPS configuration that is currently activated.

When the predetermined SL SPS configuration is activated in operation S1750, the UE transmits/receives SL SPS data to/from another UE on an activated SL SPS resource in operation S1760. For example, the SL SPS data transmission/reception may include the transmission of data for a V2X service to another UE through a PC5 radio link.

In some embodiments, a method of controlling Semi-Persistent Scheduling (SPS) for a user device may be performed by a base station. The method includes generating, by the base station, SL SPS configuration information for the user device, configuring a radio resource control (RRC) message comprising the SL SPS configuration information, and transmitting, by the base station and to the user device, the RRC message. The SL SPS configuration information comprises: an SL SPS radio network temporary identifier (RNTI) for the user device; and SL SPS index information to indicate a plurality of SL SPS configurations for the user device.

The base station may transmit to the user device a Physical Downlink Control Channel (PDCCH) comprising downlink control information (DCI), the PDCCH being scrambled by the SL SPS RNTI for the user device.

The base station may scramble a PDCCH by using the SL SPS RNTI for the user device, the PDCCH comprising activation information about one of the plurality of SL SPS configurations for the user device. The SL SPS configuration information for the user device and the PDCCH scrambled by the SL SPS RNTI enable the user device to operate an SL SPS associated with a direct communication between the user device and another user device.

The base station may set a 3-bit value in a 3-bit field in the DCI. The 3-bit field has an SL SPS index. The maximum quantity of the SL SPS configurations for the user device may be eight. In some configurations, the quantity of the SL SPS configurations for the user device may be more than one but fewer than eight. The DCI may comprise a 3-bit field having an SL SPS index. Eight different SL SPS indexes may be indicated by a 3-bit value of the 3-bit field.

The DCI may comprise a 1-bit field indicating activation or deactivation of a SL SPS configuration associated with the SL SPS index. For example, "1" may indicate the activation and "0" may indicate the deactivation (or vice versa). The base station may determine whether to activate an SL SPS configuration associated with the SL SPS index set in the 3-bit field. Based on the determining whether to activate the SL SPS configuration, the base station sets a value in a 1-bit field in the DCI.

The SL SPS configuration information may further comprise an SL SPS interval for one or more of the plurality of SL SPS configurations for the user device. For example, the base station may determine a first SL SPS interval for a first one of the plurality of SL SPS configurations for the user device and a second SL SPS interval for a second one of the plurality of SL SPS configurations for the user device. The SL SPS configuration information further comprises the first SL SPS interval and the second SL SPS interval.

The user device may be a vehicle capable of receiving the RRC message and PDCCH from an evolved NodeB and directly communicating with another mobile device. For example, the user device comprises one or more of: a vehicle having a vehicle-to-vehicle (V2V) communication capability, a vehicle having a vehicle-to-pedestrian (V2P) communication capability, a vehicle having a vehicle-to-infrastructure (V2I) communication capability, or a vehicle having a vehicle-to-everything (V2X) communication capability.

The base station may determine a quantity of SL SPS configurations for the user device, determine, based on the determined quantity of SL SPS configurations for the user device, a plurality of SL SPS configuration index indicators for the plurality of SL SPS configurations for the user device, and configure the plurality of SL SPS configurations for the user device. Each SL SPS configuration for the user device comprises a corresponding one of the plurality of SL SPS configuration index indicators, and an SL SPS interval for the corresponding one of the plurality of SL SPS configuration indicators.

The base station may determine the plurality of SL SPS configuration index indicators from predefined integer values.

A method of configuring a plurality of sidelink (SL) Semi-Persistent Scheduling (SPS) for a user device may be performed by a base station. The method includes generating, by a base station, SL SPS configuration information for the user device; configuring a radio resource control (RRC) message comprising the SL SPS configuration information; and transmitting, by the base station and to the user device, the RRC message. The SL SPS configuration information comprises: an SL SPS radio network temporary identifier (RNTI) for the user device; SL SPS index information to indicate a plurality of SL SPS configurations for the user device; a first SL SPS interval for a first SL SPS configuration for the user device; and a second SL SPS interval for a second SL SPS configuration for the user device.

The base station may transmit, to the user device, a first PDCCH associated with the first SL SPS configuration, the first PDCCH being scrambled by the SL SPS RNTI for the user device. The base station may also transmit, to the user device, a second PDCCH associated with the second SL SPS configuration, the second PDCCH being scrambled by the SL SPS RNTI for the user device. The first PDCCH indicates a 3-bit SL SPS index of the first SL SPS configuration for the user device, and the second PDCCH indicates a different 3-bit SL SPS index of the second SL SPS configuration for the user device.

A method of processing configuration information for Semi-Persistent Scheduling (SPS) for a user device may be performed by a user device. The method includes receiving, by the user device and from a base station, a radio resource control (RRC) message comprising SL SPS configuration information for the user device; receiving, by the user device, a Physical Downlink Control Channel (PDCCH) comprising downlink control information (DCI) and associated with the SL SPS RNTI; and determining, based on the PDCCH, control information of an SL SPS configuration for the user device. The SL SPS configuration information comprises: an SL SPS radio network temporary identifier (RNTI) for the user device; and SL SPS index information to indicate a plurality of SL SPS configurations for the user device.

The user device may determine the control information of the SL SPS configuration for the user device, in response to determining that the PDCCH was scrambled by the SL SPS RNTI for the user device.

The user device may descramble the PDCCH by using the received SL SPS RNTI.

The user device may be a V2X UE and may activate, based on the SL SPS configuration information for the user device and the descrambled PDCCH, an SL SPS operation for a direct communication between the user device and another V2X UE, The user device may determine, based on the received RRC message, a quantity of SL SPS configurations set for the user device.

The user device may determine, based on the received RRC message, a quantity of SL SPS configurations set for the user device, and determine an SL SPS index from a 3-bit field in the DCI, the 3-bit field having the SL SPS index.

The user device may determine, based on an activation indicator field in the DCI, an activation or deactivation of a SL SPS configuration associated with the SL SPS index, the activation indicator field being a 1-bit field.

The user device may determine SL SPS intervals for the plurality of SL SPS configurations for the user device, wherein the SL SPS configuration information further comprises the SL SPS intervals for the plurality of SL SPS configurations for the user device.

Figure 18:
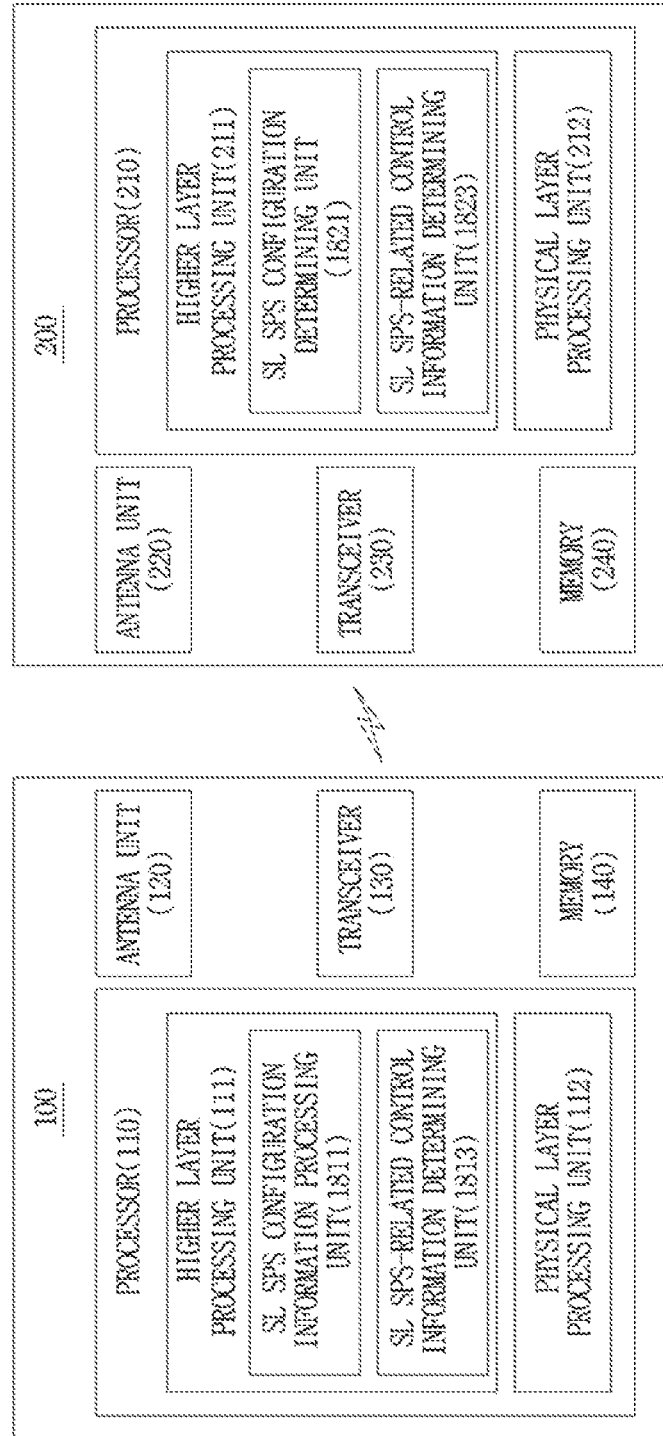
FIG. 18 is a diagram illustrating the configuration of a wireless device according to the present invention.

FIG. 18 is a diagram illustrating the configuration of a wireless device according to the present invention.

FIG. 18 illustrates a UE 100 that corresponds to an example of a downlink receiving device or an uplink transmitting device, and illustrates an eNB 200 that corresponds to an example of a downlink transmitting device or an uplink receiving device. Although not illustrated in FIG. 18, another UE that performs V2X communication with the UE 100 may exist. The configuration of the other UEs is similar to that of the UE 100, and thus detailed descriptions thereof will be omitted.

The UE 100 may include a processor 110, an antenna unit 120, a transceiver 130, and a memory 140.

The processor 110 may process signals related to a baseband, and may include a higher layer processing unit 111 and a physical layer processing unit 112. The higher layer processing unit 111 may process the operations of a Medium Access Control (MAC) layer, a Radio Resource Control (RRC) layer, or a higher layer that is higher than them. The physical layer processing unit 112 may process the operations of a PHY layer (e.g., processing an uplink transmission signal or processing a downlink reception signal). The processor 110 may control the general operations of the UE 100, in addition to processing signals related to a baseband.

The antenna unit 120 may include one or more physical antennas, and may support MIMO transmission/reception when a plurality of antennas is included. The transceiver 130 may include a Radio Frequency (RF) transmitter and an RF receiver. The memory 140 may store information processed by the processor 110, software, operating system, applications, or the like associated with the operations of the UE 100, and may include elements such as a buffer or the like.

The eNB 200 may include a processor 210, an antenna unit 220, a transceiver 230, and a memory 240.

The processor 210 processes signals related to a baseband, and may include a higher layer processing unit 211 and a physical layer processing unit 212. The higher layer processing unit 211 may process the operations of an MAC layer, an RRC layer, or a higher layer. The physical layer processing unit 212 may process the operations of a PHY layer (e.g., processing a downlink transmission signal or processing an uplink reception signal). The processor 210 may control the general operations of the eNB 200, in addition to processing signals related to a baseband.

The antenna unit 220 may include one or more physical antennas, and may support MIMO transmission/reception when a plurality of antennas are included. The transceiver 230 may include an RF transmitter and an RF receiver. The memory 240 may store information processed by the processor 210, software, operating system, applications, or the like associated with the operations of the eNB 200, and may include elements such as a buffer or the like.

The processor 110 of the UE 100 may be configured to implement the operations of the UE, which have been described in all of the embodiments of the present invention.

For example, the physical layer processing unit 112 of the processor 110 of the UE 100 may receive SL SPS configuration information received through an RRC message from the eNB and then deliver the same to the higher layer processing unit 111. The physical layer processing unit 112 may also demodulate information (e.g., SL SPS activation/deactivation indication information and/or SL grant information) received from the eNB through SL SPS configuration information PDCCH/EPDCCH DCI or MAC CE, and may deliver the same to the higher layer processing unit 111.

Alternatively, the higher layer processing unit 111 of the processor 110 of the UE 100 may include an SL SPS configuration information processing unit 1811 and an SL SPS-related control information processing unit 1812. The SL SPS configuration information processing unit 1811 may determine configuration information associated with a plurality of SL SPS configurations provided from the eNB through an RRC message, and may store required information. The SL SPS-related control information processing unit 1812 may determine information (e.g. SL SPS activation/deactivation indication information and/or SL grant information) which is associated with a predetermined SL SPS configuration and is received from the eNB, and may store required information. Accordingly, the processor 110 may activate or deactivate a predetermined SL SPS configuration with respect to the UE 100, and may transmit/receive SL SPS data to/from another UE through the physical layer processing unit 112 on a resource allocated for the activated SL SPS configuration.

The processor 210 of the eNB 200 may be configured to implement the operations of the eNB, which have been described in all of the embodiments of the present invention.

For example, the higher layer processing unit 211 of the processor 210 of the eNB 200 may include an SL SPS configuration determining unit 1821 and an SL SPS-related control information determining unit 1823. The SL SPS configuration determining unit 1821 may determine whether an SL SPS configuration is needed for a predetermined UE based on V2X service information or the like received from UE(s), and may determine one or more SL SPS configurations to be configured for the predetermined UE. The SL SPS-related control information determining unit 1823 may generate information (e.g., SL SPS activation/deactivation indication information and/or SL grant information) for the predetermined UE.

Also, the physical layer processing unit 212 of the processor 210 of the eNB 200 may transmit, to the UE 100, SL SPS configuration information and SL SPS-related control information, which are delivered from the higher layer processing unit 211. Also, the physical layer processing unit 212 may transmit a message to a UE, such as an SIB V2X or the like, which is delivered from the higher layer processing unit 211, and may receive V2X service information or the like from a UE to deliver the same to the higher layer processing unit 211.

According to one or more embodiments of the present disclosure, an eNB is capable of supporting multiple SPS resource allocation schemes for radio resources for D2D communication, which are required when a UE performs multiple V2X services and general cellular services, and thus, the number of repetitive control information transmissions performed by the eNB may be reduced and the efficiency of the use of radio resources may be increased.

What is claimed is:

1. A method of controlling Semi-Persistent Scheduling (SPS) for a user device, the method comprising:
   determining, by a base station, sidelink (SL) SPS radio network temporary identifier (RNTI) for the user device; and
   transmitting, by the base station, a SL grant including downlink control information (DCI) to the user device with a Physical Downlink Control Channel (PDCCH),
   wherein the DCI comprises a SL SPS index field and an activation/release indication field if the DCI with Cyclic Redundancy Check (CRC) is scrambled with the SL SPS RNTI,
   wherein a start subframe for Sidelink Control (SC) period is determined based on an offset value and a subframe in which the SL grant is received,
   wherein an index of a subframe for SC period is relative to System Frame Number (SFN) 0, and
   wherein a value for the SL SPS RNTI is determined as one of values which is described in the table below:

| Values (hexa-decimal) | RNTI |
|---|---|
| 0001-FFF3 | SL SPS RNTI. |

2. The method of claim 1, further comprising:
   scrambling, by the base station, PDCCH by using the SL SPS RNTI for the user device,
   wherein the DCI scrambled by the SL SPS RNTI enables the user device to operate an SL SPS associated with a direct communication between the user device and another user device.

3. The method of claim 1, further comprising:
   setting a value in a 3-bit in the SL SPS index field,
   wherein a maximum quantity of SL SPS configurations for the user device is eight.

4. The method of claim 3, further comprising:
   setting a value in a 1-bit field in the activation/release indication field.

5. The method of claim 1, further comprising:
   determining, by the base station, SL SPS configuration information for the user device;
   determining a first SL SPS interval for a first one of a plurality of SL SPS configurations for the user device; and
   determining a second SL SPS interval for a second one of the plurality of SL SPS configurations for the user device,
   wherein the SL SPS configuration information further comprises the first SL SPS interval and the second SL SPS interval.

6. The method of claim 5, wherein the first SL SPS interval and the second SL SPS interval have different intervals.

7. The method of claim 1, wherein the user device comprises one or more of: a vehicle having a vehicle-to-vehicle (V2V) communication capability, a vehicle having a vehicle-to-pedestrian (V2P) communication capability, a vehicle having a vehicle-to-infrastructure (V2I) communication capability, or a vehicle having a vehicle-to-everything (V2X) communication capability.

8. The method of claim 1, further comprising:
   transmitting, by the base station, a radio resource control (RRC) message comprising release information (implicitReleaseAfter) to the user device.

9. The method of claim 8, wherein SL grant is released when consecutive Medium Access Control Protocol Data Units (MAC PDUs) containing zero MAC Service Data Unit (SDU) is transmitted, and
   wherein a number of the consecutive MAC PDUs is determined by the release information.

* * * * *